United States Patent
Wu et al.

(10) Patent No.: US 10,742,685 B2
(45) Date of Patent: Aug. 11, 2020

(54) FLOW CONTROL METHOD AND DEVICE

(71) Applicant: Huawei Technologies Co., Ltd., Shenzhen (CN)

(72) Inventors: Ping Wu, Beijing (CN); Zhengquan Huang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 309 days.

(21) Appl. No.: 15/858,330

(22) Filed: Dec. 29, 2017

(65) Prior Publication Data

US 2018/0124118 A1 May 3, 2018

Related U.S. Application Data

(63) Continuation of application No. PCT/CN2016/097819, filed on Sep. 1, 2016.

(30) Foreign Application Priority Data

Sep. 23, 2015 (CN) .......................... 2015 1 0612886

(51) Int. Cl.
*H04L 29/06* (2006.01)
*H04L 12/24* (2006.01)
(Continued)

(52) U.S. Cl.
CPC .......... *H04L 63/20* (2013.01); *H04L 41/0893* (2013.01); *H04L 43/026* (2013.01);
(Continued)

(58) Field of Classification Search
CPC ... H04L 63/20; H04L 63/0263; H04L 63/101; H04L 63/105; H04L 45/54; H04L 43/026;
(Continued)

(56) References Cited

U.S. PATENT DOCUMENTS 7,143,438 B1 * 11/2006 Coss ................ H04L 29/06
726/11
7,231,664 B2 * 6/2007 Markham ........... H04L 63/0272
455/445

(Continued)

FOREIGN PATENT DOCUMENTS

CN 1604564 A 4/2005
CN 101119321 A 2/2008
(Continued)

OTHER PUBLICATIONS

Machine Translation and Abstract of Chinese Publication No. CN1604564, Apr. 6, 2005, 12 pages.
(Continued)

*Primary Examiner* — Saleh Najjar
*Assistant Examiner* — Feliciano S Mejia
(74) *Attorney, Agent, or Firm* — Conley Rose, P.C.

(57) ABSTRACT

A flow control method and apparatus are provided. The flow control apparatus groups stored multiple pieces of address information into at least two security groups according to attribute information; arranges the at least two security groups, so that a security group at a high level may completely include a security group at a low level and security groups at a same level are completely independent of each other without overlap; receives a policy configuration instruction; configures a specified rule according to the policy configuration instruction, and configures a storage sequence of the specified rule according to the policy configuration instruction, where the specified rule is generated according to the policy configuration instruction; receives a data packet after the at least two rules are configured; and processes the data packet according to the at least two rules and storage sequences of the rules, to implement flow control.

20 Claims, 13 Drawing Sheets

(51) Int. Cl.
*H04L 12/741* (2013.01)
*H04L 12/26* (2006.01)
*H04L 12/813* (2013.01)

(52) U.S. Cl.
CPC .............. *H04L 45/54* (2013.01); *H04L 47/20* (2013.01); *H04L 63/0263* (2013.01); *H04L 63/101* (2013.01); *H04L 63/102* (2013.01); *H04L 63/104* (2013.01); *H04L 63/105* (2013.01); *Y02D 50/30* (2018.01)

(58) Field of Classification Search
CPC ..... H04L 63/102; H04L 63/104; H04L 47/20; H04L 41/0893; Y02D 50/30
See application file for complete search history.

(56) References Cited

U.S. PATENT DOCUMENTS

| | | | |
|---|---|---|---|
| 7,636,937 | B1 | 12/2009 | Bhattacharya et al. |
| 8,819,561 | B2* | 8/2014 | Gupta ..................... H04L 41/22 709/224 |
| 9,009,293 | B2 | 4/2015 | Batz et al. |
| 9,825,960 | B2* | 11/2017 | Khan ..................... H04L 63/102 |
| 9,894,100 | B2* | 2/2018 | Pernicha ................ H04L 63/20 |
| 10,218,522 | B2* | 2/2019 | Qiu ......................... H04L 12/18 |
| 10,411,951 | B2* | 9/2019 | Clark ..................... H04L 41/0672 |
| 2004/0160903 | A1 | 8/2004 | Gai et al. |
| 2005/0055573 | A1* | 3/2005 | Smith ................... G06F 21/6218 726/4 |
| 2008/0031233 | A1 | 2/2008 | Ito et al. |
| 2009/0300748 | A1 | 12/2009 | Diehl et al. |
| 2010/0205296 | A1* | 8/2010 | Zhang ..................... H04L 47/12 709/224 |
| 2011/0239216 | A1* | 9/2011 | Miyajima ............... G06F 9/455 718/1 |
| 2012/0099591 | A1 | 4/2012 | Kotha et al. |
| 2014/0025796 | A1* | 1/2014 | Vibhor ................ H04L 67/1097 709/222 |
| 2017/0302470 | A1* | 10/2017 | Clark .................. H04L 41/0893 |

FOREIGN PATENT DOCUMENTS

| | | |
|---|---|---|
| CN | 101127713 A | 2/2008 |
| CN | 101640634 A | 2/2010 |
| CN | 104394080 A | 3/2015 |
| JP | 2008042506 A | 2/2008 |
| JP | 2008131463 A | 6/2008 |
| JP | 2009077030 A | 4/2009 |
| WO | 2010088600 A1 | 8/2010 |

OTHER PUBLICATIONS

Machine Translation and Abstract of Chinese Publication No. CN104394080, Mar. 4, 2015, 12 pages.
Foreign Communication From a Counterpart Application, Chinese Application No. 201510612886.X, Chinese Office Action dated Apr. 2, 2019, 6 pages.
Foreign Communication From a Counterpart Application, European Application No. 16847994.7, Extended European Search Report dated Mar. 8, 2018, 10 pages.
Machine Translation and Abstract of Chinese Publication No. CN101119321, Feb. 6, 2008, 12 pages.
Machine Translation and Abstract of Chinese Publication No. CN101640634, Feb. 3, 2010, 12 pages.
Foreign Communication From a Counterpart Application, PCT Application No. PCT/CN2016/097819, English Translation of International Search Report dated Dec. 1, 2016, 2 pages.
Machine Translation and Abstract of Japanese Publication No. JP2008131463, Jun. 5, 2008, 17 pages.
Machine Translation and Abstract of Japanese Publication No. JP2009077030, Apr. 9, 2009, 26 pages.
Foreign Communication From a Counterpart Application, Japanese Application No. 2017-564004, Japanese Notice of Allowance dated Dec. 9, 2019, 3 pages.

* cited by examiner

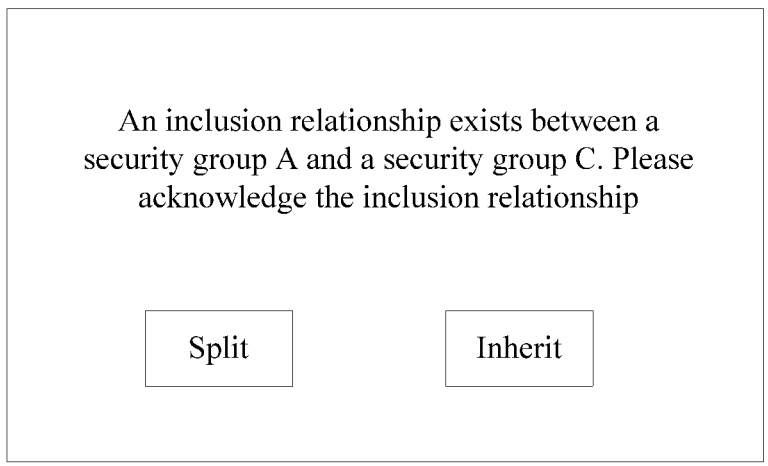
FIG. 5
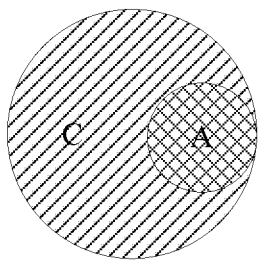
FIG. 6
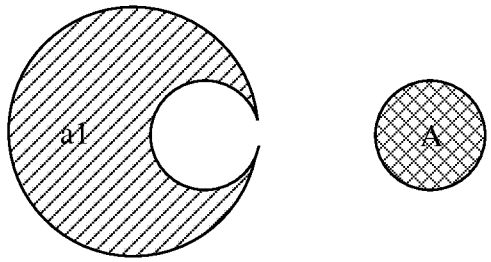
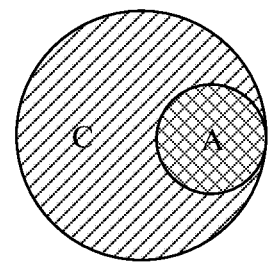
FIG. 7A
FIG. 7B

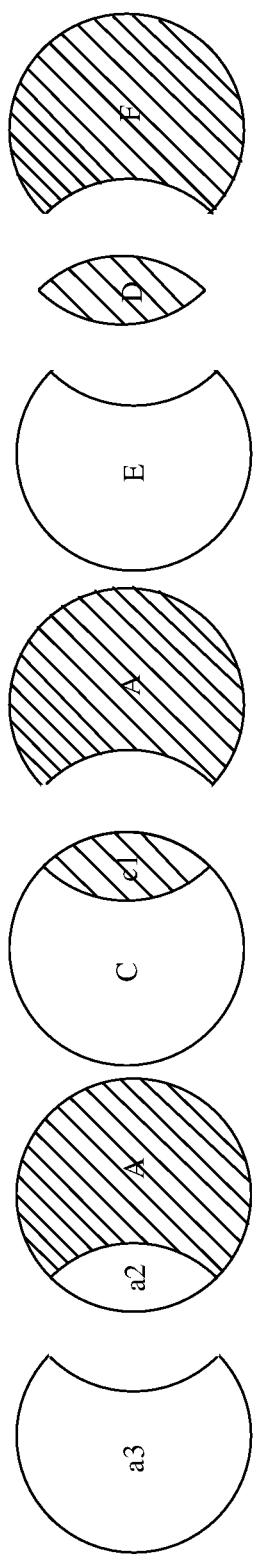

FLOW CONTROL METHOD AND DEVICE

CROSS-REFERENCE TO RELATED APPLICATIONS

This application is a continuation of International Application No. PCT/CN2016/097819, filed on Sep. 1, 2016, which claims priority to Chinese Patent Application No. 201510612886.X, filed on Sep. 23, 2015, both of which are hereby incorporated by reference in their entireties.

TECHNICAL FIELD

The present disclosure relates to the field of network technologies, and in particular, to a flow control method and device.

BACKGROUND

With rapid development of network technologies, there are more network-based applications, and the applications are increasingly complex. When network communication is performed using these applications, some security problems inevitably occur. For example, network resource leakage is caused when an unauthorized user accesses some confidential network resources. Therefore, to ensure network security, flow control needs to be performed on a data packet transmitted in a network.

Currently, flow control is basically performed using an access control list (ACL). However, before flow control is performed using the ACL, an administrator needs to manually configure multiple rules and storage sequences of the multiple rules in the ACL. Each rule includes a match condition and an action indicator. The match condition may include source address information, destination address information, and a protocol type. The source address information may include a source Internet Protocol (IP) address, a source port number, and the like. The destination address information may include a destination IP address, a destination port number, and the like. Afterward, a packet switching device such as a switch or a router may perform flow control according to the multiple rules configured by the administrator. The packet switching device receives a data packet. The packet switching device successively compares source address information, destination address information, and a protocol type that are carried in the data packet with a match condition in the rules in the ACL, and if determining that the source address information, the destination address information, and the protocol type that are carried in the data packet are the same as the match condition in a currently compared rule, the packet switching device determines that a target rule is found, and processes the data packet according to an action indicator in the target rule; if acknowledging that the source address information, the destination address information, and the protocol type that are carried in the data packet are different from the match condition in the currently compared rule, the packet switching device continues to make a comparison with a next rule in the ACL, to implement flow control.

Because the multiple rules and the storage sequences of the multiple rules are all manually configured by the administrator, as the administrator updates the rules continuously, a redundant rule and an invalid rule may occur in the multiple rules. Consequently, accuracy of flow control is reduced. A redundant rule is a phenomenon in which at least two rules matching a same flow and including a same action indicator exist in the multiple rules. An invalid rule is a means that at least two rules in the multiple rules match a same flow but have different action indicators, and a storage sequence of a rule having a larger flow range precedes to that of a rule having a smaller flow range. Consequently, the rule ranks in the back in terms of sequence cannot be matched. The flow range is a range covered by a match condition.

SUMMARY

To resolve the problems in the prior art, embodiments of the present disclosure provide a flow control method and device. The technical solutions are as follows.

According to a first aspect, a flow control method is provided, and the method includes grouping stored multiple pieces of address information into at least two security groups according to attribute information of hosts to which the multiple pieces of address information respectively belong, where the attribute information includes a service type or a security level; arranging the at least two security groups, so that in arranged security groups, a security group at a high level may completely include a security group at a low level and security groups at a same level are completely independent of each other without overlap, where the level is used to indicate whether the security group is a parent group, a child group, or an independent security group; receiving a policy configuration instruction, where the policy configuration instruction carries a specified source group, a specified destination group, and a specified action indicator, and the specified source group and the specified destination group are two different security groups in the arranged security groups; configuring a specified rule according to the policy configuration instruction, and configuring a storage sequence of the specified rule according to the policy configuration instruction, where the specified rule is any rule in at least two to-be-configured rules; receiving a data packet after the at least two rules are configured, where the data packet carries source address information and destination address information; and processing the data packet according to the at least two rules and storage sequences of the at least two rules, to implement flow control.

With reference to the first aspect, in a first possible implementation of the first aspect, the arranging the at least two security groups includes determining whether an inclusion relationship or an overlap relationship exists between a first security group and multiple second security groups, where the first security group is an unarranged security group in the at least two security groups, the multiple second security groups are the arranged security groups in the at least two security groups, the inclusion relationship means that the first security group is a subset of the second security group or that the second security group is a subset of the first security group, and the overlap relationship means that an intersection exists between the first security group and the second security group and that the first security group is unequal to the second security group; if an inclusion relationship exists between the first security group and at least two second security groups in the multiple second security groups, determining a security group from the at least two second security groups as a third security group; displaying first acknowledgement prompt information, where the first acknowledgement prompt information is used to prompt an administrator to process an inclusion relationship between the first security group and the third security group; and if a first processing instruction is received according to the first acknowledgement prompt information, processing the inclusion relationship between the first security group and the third security group according to the first processing instruction.

With reference to the first possible implementation of the first aspect, in a second possible implementation of the first aspect, the determining a security group from the at least two second security groups as a third security group includes, if the first security group is included in all security groups in the at least two second security groups, selecting, from the at least two second security groups, a security group having a smallest address range; or if the first security group includes all security groups in the at least two second security groups, selecting, from the at least two second security groups, a security group having a largest address range; or if the first security group is included in at least one second security group in the at least two second security groups, and the first security group further includes a remaining second security group in the at least two second security groups, selecting, from the at least one second security group, a security group having a smallest address range, or selecting, from the remaining second security group, a security group having a largest address range; and determining the selected security group as the third security group.

With reference to the first possible implementation of the first aspect or the second possible implementation of the first aspect, in a third possible implementation of the first aspect, the processing the inclusion relationship between the first security group and the third security group according to the first processing instruction includes determining, from the first security group and the third security group, a security group having a larger address range as a fourth security group; and determining, from the first security group and the third security group, a security group having a smaller address range as a fifth security group; if the first processing instruction is a first split instruction, removing, from the fourth security group, address information the same as that in the fifth security group to obtain a first child security group; and if the first processing instruction is an inheritance instruction, setting the fifth security group as a secondary security group, and setting the fifth security group as a child group of the fourth security group, where the secondary security group is a security group that has an inclusion relationship with another security group in the arranged security groups.

With reference to the first possible implementation of the first aspect, in a fourth possible implementation of the first aspect, after the determining whether an inclusion relationship or an overlap relationship exists between a first security group and multiple second security groups, the method further includes, if an overlap relationship exists between the first security group and at least two second security groups in the multiple second security groups, selecting a security group from the at least two second security groups as a sixth security group; displaying second acknowledgement prompt information, where the second acknowledgement prompt information is used to prompt the administrator to process an overlap relationship between the first security group and the sixth security group; and if a second processing instruction is received according to the second acknowledgement prompt information, processing the overlap relationship between the first security group and the sixth security group according to the second processing instruction.

With reference to the fourth possible implementation of the first aspect, in a fifth possible implementation of the first aspect, the processing the overlap relationship between the first security group and the sixth security group according to the second processing instruction includes, if the second processing instruction is an instruction for retaining an old group, grouping, into a second child security group, address information that is in the first security group and that is the same as that in the sixth security group, and grouping, into a third child security group, other address information in the first security group than that in the second child security group; and setting the second child security group as a secondary security group, and setting the second child security group as a child group of the sixth security group.

With reference to the fourth possible implementation of the first aspect, in a sixth possible implementation of the first aspect, the processing the overlap relationship between the first security group and the sixth security group according to the second processing instruction includes, if the second processing instruction is an instruction for retaining a new group, grouping, into a fourth child security group, address information that is in the sixth security group and that is the same as that in the first security group, and grouping, into a fifth child security group, other address information in the sixth security group than that in the fourth child security group; and setting the fourth child security group as a secondary security group, and setting the fourth child security group as a child group of the first security group.

With reference to the fourth possible implementation of the first aspect, in a seventh possible implementation of the first aspect, the processing the overlap relationship between the first security group and the sixth security group according to the second processing instruction includes, if the second processing instruction is a second split instruction, respectively grouping, into three security groups, same address information in the first security group and the sixth security group, other address information in the first security group than the address information the same as that in the sixth security group, and other address information in the sixth security group than the address information the same as that in the first security group.

With reference to any one of the first aspect to the seventh possible implementation of the first aspect, in an eighth possible implementation of the first aspect, the configuring a specified rule according to the policy configuration instruction includes, if both the specified source group and the specified destination group are primary security groups, configuring the specified rule according to the specified source group, the specified destination group, and the specified action indicator, where the primary security group is an independent security group that has no inclusion relationship or overlap relationship with another security group in the arranged security groups.

With reference to any one of the first aspect to the seventh possible implementation of the first aspect, in a ninth possible implementation of the first aspect, the configuring the specified rule according to the policy configuration instruction, and configuring a storage sequence of the specified rule according to the policy configuration instruction includes, if the specified source group or the specified destination group is a secondary security group, determining whether a first rule is configured, where the first rule is a rule between a parent group of the specified source group and the specified destination group, a rule between the specified source group and a parent group of the specified destination group, or a rule between a parent group of the specified source group and a parent group of the specified destination group; if the first rule is configured, determining whether the specified action indicator is the same as an action indicator included in the first rule; and forbidding configuring of the specified rule if the specified action indicator is the same as the action indicator included in the first rule.

With reference to the ninth possible implementation of the first aspect, in a tenth possible implementation of the first aspect, after the determining whether the specified action indicator is the same as an action indicator included in the first rule, the method further includes, if the specified action indicator conflicts with the action indicator included in the first rule, configuring the specified rule according to the specified source group, the specified destination group, and the specified action indicator; and setting that the storage sequence of the specified rule precedes that of the first rule.

With reference to the ninth possible implementation of the first aspect or the tenth possible implementation of the first aspect, in an eleventh possible implementation of the first aspect, after the forbidding configuring of the specified rule, the method further includes displaying "configuration forbidden" prompt information to prompt the administrator that configuring of the specified rule is forbidden and that the specified rule is a redundant rule.

With reference to any one of the first aspect to the seventh possible implementation of the first aspect, in a twelfth possible implementation of the first aspect, the configuring the specified rule according to the policy configuration instruction, and configuring a storage sequence of the specified rule according to the policy configuration instruction includes determining whether a second rule is configured if the specified source group is a secondary security group and the specified destination group is a parent group of a seventh security group, or if the specified source group is a parent group of an eighth security group and the specified destination group is a secondary security group, where when the specified source group is the secondary security group, and the specified destination group is the parent group of the seventh security group, the second rule is a rule between a parent group of the specified source group and the specified destination group or a rule between the specified source group and the seventh security group; or when the specified source group is the parent group of the eighth security group, and the specified destination group is the secondary security group, the second rule is a rule between the specified source group and the specified destination group or a rule between the eighth security group and a parent group of the specified destination group, where the seventh security group and the eighth security group are any security groups in the arranged security groups; if the second rule is configured, determining whether the specified action indicator is the same as an action indicator included in the second rule; and if the specified action indicator is the same as the action indicator included in the second rule, configuring the specified rule according to the specified source group, the specified destination group, and the specified action indicator.

With reference to the twelfth possible implementation of the first aspect, in a thirteenth possible implementation of the first aspect, after the determining whether the specified action indicator is the same as an action indicator included in the second rule, the method further includes, if the specified action indicator conflicts with the action indicator included in the second rule, displaying policy conflict prompt information to prompt the administrator to set storage sequences of the specified rule and the second rule; and when receiving a sorting operation of the administrator, setting the storage sequences of the specified rule and the second rule according to the sorting operation.

According to a second aspect, a flow control apparatus is provided, and the apparatus includes a grouping module, adapted to group stored multiple pieces of address information into at least two security groups according to attribute information of hosts to which the multiple pieces of address information respectively belong, where the attribute information includes a service type or a security level; a arrange processing module, adapted to arrange the at least two security groups, so that in arranged security groups, a security group at a high level may completely include a security group at a low level and security groups at a same level are completely independent of each other without overlap, where the level is used to indicate whether the security group is a parent group, a child group, or an independent security group; a receiving module, adapted to receive a policy configuration instruction, where the policy configuration instruction carries a specified source group, a specified destination group, and a specified action indicator, and the specified source group and the specified destination group are two different security groups in the arranged security groups; a configuration module, adapted to configure a specified rule according to the policy configuration instruction, and configure a storage sequence of the specified rule according to the policy configuration instruction, where the specified rule is any rule in at least two to-be-configured rules; where the receiving module is further adapted to receive a data packet after the at least two rules are configured, where the data packet carries source address information and destination address information; and a packet processing module, adapted to process the data packet according to the at least two rules and storage sequences of the at least two rules, to implement flow control.

With reference to the second aspect, in a first possible implementation of the second aspect, the arrange processing module includes a judging unit, adapted to determine whether an inclusion relationship or an overlap relationship exists between a first security group and multiple second security groups, where the first security group is an unarranged security group in the at least two security groups, the multiple second security groups are the arranged security groups in the at least two security groups, the inclusion relationship means that the first security group is a subset of the second security group or that the second security group is a subset of the first security group, and the overlap relationship means that an intersection exists between the first security group and the second security group and that the first security group is unequal to the second security group; a determining unit, adapted to, if an inclusion relationship exists between the first security group and at least two second security groups in the multiple second security groups, determine a security group from the at least two second security groups as a third security group; a display unit, adapted to display first acknowledgement prompt information, where the first acknowledgement prompt information is used to prompt an administrator to process an inclusion relationship between the first security group and the third security group; and an inclusion relationship processing unit, adapted to, if a first processing instruction is received according to the first acknowledgement prompt information, process the inclusion relationship between the first security group and the third security group according to the first processing instruction.

With reference to the first possible implementation of the second aspect, in a second possible implementation of the second aspect, the determining unit includes a selection subunit, adapted to, if the first security group is included in all security groups in the at least two second security groups, select, from the at least two second security groups, a security group having a smallest address range; or if the first security group includes all security groups in the at least two second security groups, select, from the at least two second security groups, a security group having a largest address range; or if the first security group is included in at least one second security group in the at least two second security groups, and the first security group further includes a remaining second security group in the at least two second security groups, select, from the at least one second security group, a security group having a smallest address range, or select, from the remaining second security group, a security group having a largest address range; and a determining subunit, adapted to determine the selected security group as the third security group.

With reference to the first possible implementation of the second aspect or the second possible implementation of the second aspect, in a third possible implementation of the second aspect, the inclusion relationship processing unit includes a determining subunit, adapted to, if the first processing instruction is received according to the first acknowledgement prompt information, determine, from the first security group and the third security group and according to the first processing instruction, a security group having a larger address range as a fourth security group, and determine, from the first security group and the third security group, a security group having a smaller address range as a fifth security group; a removal subunit, adapted to, if the first processing instruction is a first split instruction, remove, from the fourth security group, address information the same as that in the fifth security group to obtain a first child security group; and a setting subunit, adapted to, if the first processing instruction is an inheritance instruction, set the fifth security group as a secondary security group, and set the fifth security group as a child group of the fourth security group, where the secondary security group is a security group that has an inclusion relationship with another security group in the arranged security groups.

With reference to the first possible implementation of the second aspect, in a fourth possible implementation of the second aspect, the arrange processing module further includes a selection unit, adapted to, if an overlap relationship exists between the first security group and at least two second security groups in the multiple second security groups, select a security group from the at least two second security groups as a sixth security group; where the display unit is further adapted to display second acknowledgement prompt information, where the second acknowledgement prompt information is used to prompt the administrator to process an overlap relationship between the first security group and the sixth security group; and an overlap relationship processing unit, adapted to, if a second processing instruction is received according to the second acknowledgement prompt information, process the overlap relationship between the first security group and the sixth security group according to the second processing instruction.

With reference to the fourth possible implementation of the second aspect, in a fifth possible implementation of the second aspect, the overlap relationship processing unit includes a grouping subunit, adapted to, if the second processing instruction is received according to the second acknowledgement prompt information, and the second processing instruction is an instruction for retaining an old group, group, into a second child security group, address information that is in the first security group and that is the same as that in the sixth security group, and group, into a third child security group, other address information in the first security group than that in the second child security group; and a setting subunit, adapted to set the second child security group as a secondary security group, and set the second child security group as a child group of the sixth security group.

With reference to the fourth possible implementation of the second aspect, in a sixth possible implementation of the second aspect, the overlap relationship processing unit includes a grouping subunit, adapted to, if the second processing instruction is received according to the second acknowledgement prompt information, and the second processing instruction is an instruction for retaining a new group, group, into a fifth child security group, address information that is in the sixth security group and that is the same as that in the first security group, and group, into a fifth child security group, other address information in the sixth security group than that in the fourth child security group; and a setting subunit, adapted to set the fourth child security group as a secondary security group, and set the fourth child security group as a child group of the first security group.

With reference to the fourth possible implementation of the second aspect, in a seventh possible implementation of the second aspect, the overlap relationship processing unit includes a grouping subunit, adapted to, if the second processing instruction is received according to the second acknowledgement prompt information, and the second processing instruction is a second split instruction, respectively group, into three security groups, same address information in the first security group and the sixth security group, other address information in the first security group than the address information the same as that in the sixth security group, and other address information in the sixth security group than the address information the same as that in the first security group.

With reference to any one of the second aspect to the seventh possible implementation of the second aspect, in an eighth possible implementation of the second aspect, the configuration module includes a configuration unit, adapted to, if both the specified source group and the specified destination group are primary security groups, configure the specified rule according to the specified source group, the specified destination group, and the specified action indicator, and configure the storage sequence of the specified rule, where the primary security group is an independent security group that has no inclusion relationship or overlap relationship with another security group in the arranged security groups.

With reference to any one of the second aspect to the seventh possible implementation of the second aspect, in a ninth possible implementation of the second aspect, the configuration module includes a judging unit, adapted to, if the specified source group or the specified destination group is a secondary security group, determine whether a first rule is configured, where the first rule is a rule between a parent group of the specified source group and the specified destination group, a rule between the specified source group and a parent group of the specified destination group, or a rule between a parent group of the specified source group and a parent group of the specified destination group; where the judging unit is further adapted to, if the first rule is configured, determine whether the specified action indicator is the same as an action indicator included in the first rule; and a configuration forbidding unit, adapted to forbid configuring of the specified rule if the specified action indicator is the same as the action indicator included in the first rule.

With reference to the ninth possible implementation of the second aspect, in a tenth possible implementation of the second aspect, the configuration module further includes a configuration unit, adapted to, if the specified action indicator conflicts with the action indicator included in the first rule, configure the specified rule according to the specified source group, the specified destination group, and the specified action indicator; and a setting unit, adapted to set that the storage sequence of the specified rule precedes that of the first rule.

With reference to the ninth possible implementation of the second aspect or the tenth possible implementation of the second aspect, in an eleventh possible implementation of the second aspect, the configuration module further includes a display unit, adapted to display "configuration forbidden" prompt information to prompt the administrator that configuring of the specified rule is forbidden and that the specified rule is a redundant rule.

With reference to any one of the second aspect to the seventh possible implementation of the second aspect, in a twelfth possible implementation of the second aspect, the configuration module includes a judging unit, adapted to determine whether a second rule is configured if the specified source group is a secondary security group and the specified destination group is a parent group of a seventh security group, or if the specified source group is a parent group of an eighth security group and the specified destination group is a secondary security group, where when the specified source group is the secondary security group, and the specified destination group is the parent group of the seventh security group, the second rule is a rule between a parent group of the specified source group and the specified destination group or a rule between the specified source group and the seventh security group; or when the specified source group is the parent group of the eighth security group, and the specified destination group is the secondary security group, the second rule is a rule between the specified source group and the specified destination group or a rule between the eighth security group and a parent group of the specified destination group, where the seventh security group and the eighth security group are any security groups in the arranged security groups; where the judging unit is further adapted to, if the second rule is configured, determine whether the specified action indicator is the same as an action indicator included in the second rule; and a configuration unit, adapted to, if the specified action indicator is the same as the action indicator included in the second rule, configure the specified rule according to the specified source group, the specified destination group, and the specified action indicator.

With reference to the twelfth possible implementation of the second aspect, in a thirteenth possible implementation of the second aspect, the configuration module further includes a display unit, adapted to, if the specified action indicator conflicts with the action indicator included in the second rule, display policy conflict prompt information to prompt the administrator to set storage sequences of the specified rule and the second rule; and a setting unit, adapted to, when a sorting operation of the administrator is received, set the storage sequences of the specified rule and the second rule according to the sorting operation.

In the embodiments of the present disclosure, the stored multiple pieces of address information are grouped into the at least two security groups according to the attribute information of the hosts to which the multiple pieces of address information belong, and the at least two security groups are arranged, so that in the arranged security groups, the security group at a high level may completely include the security group at a low level and the security groups at a same level are completely independent of each other without overlap. Further, the policy configuration instruction is received, and the policy configuration instruction carries the specified source group, the specified destination group, and the specified action indicator. The specified rule and the storage sequence of the specified rule are configured according to the policy configuration instruction. Therefore, occurrence of a redundant rule and an invalid rule can be avoided, and accuracy of flow control is improved. In addition, when the data packet is received, the data packet is processed according to storage sequences of rules. Therefore, time spent on matching a rule is reduced, and efficiency of flow control is improved.

It should be understood that, the foregoing general description and the following detailed description are merely illustrative and explanatory, and cannot limit the present disclosure.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 5 is a schematic diagram of first acknowledgement prompt information according to an embodiment of the present disclosure;

FIG. 6 is a schematic diagram of an inclusion relationship between a first security group and a third security group according to an embodiment of the present disclosure;

FIG. 7A is a schematic diagram of a split between a fourth security group and a fifth security group when a first processing instruction is a first split instruction according to an embodiment of the present disclosure;

FIG. 7B is a schematic inheritance diagram of a fourth security group and a fifth security group when a first processing instruction is an inheritance instruction according to an embodiment of the present disclosure;

FIG. 8A is a schematic grouping diagram of a first security group and a sixth security group when a second processing instruction is an instruction for retaining an old group according to an embodiment of the present disclosure;

FIG. 8B is a schematic grouping diagram of a first security group and a sixth security group when a second processing instruction is an instruction for retaining a new group according to an embodiment of the present disclosure;

FIG. 8C is a schematic grouping diagram of a first security group and a sixth security group when a second processing instruction is a second split instruction according to an embodiment of the present disclosure;

DESCRIPTION OF EMBODIMENTS

Figure 1:
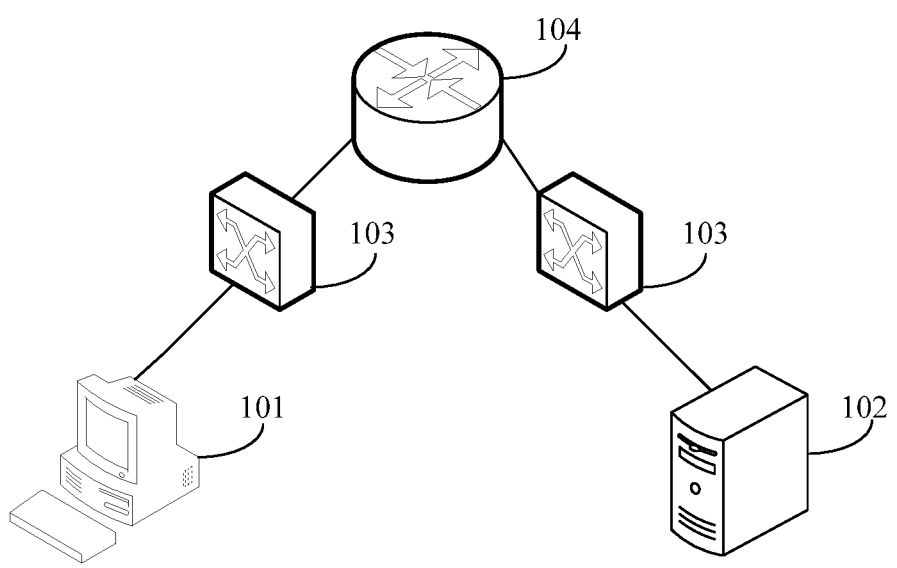
FIG. 1 is a schematic diagram of an implementation environment of a flow control method according to an embodiment of the present disclosure.

FIG. 1 is a schematic diagram of an implementation environment of a flow control method according to an embodiment of the present disclosure. Referring to FIG. 1, the implementation environment may include a host 101, a host 102, switches 103, and a router 104. The host 101 and the host 102 may be devices such as servers or terminals that perform network communication. The host 101 and the host 102 are adapted to transmit a data packet. The switch 103 and the router 104 are adapted to process the transmitted data packet. A device for performing flow control in this embodiment of the present disclosure is a packet switching device. The packet switching device may be the switch 103 and/or the router 104. Certainly, the packet switching device may be a firewall device, and the firewall device may be disposed on the switch 103 or the router 104. This is not specifically limited in this embodiment of the present disclosure.

Before the embodiments of the present disclosure are described in detail, an application scenario of the embodiments of the present disclosure is first described. Currently, if communication needs to be performed between two hosts, a data packet needs to be transmitted between the two hosts using a packet switching device. However, when some hosts are forbidden to access confidential network resources, the packet switching device may process the transmitted data packet to implement flow control. When flow control is performed using an ACL, multiple rules stored in the ACL and storage sequences of the multiple rules in the ACL are all configured by an administrator manually. In addition, in an actual application, the ACL stores an extremely large quantity of rules, a quantity of administrators may also be extremely large, and a configuration time period of the rules may also be extremely long. Therefore, as the administrator updates the rules continuously, it is difficult for the administrator to find existence of a redundant rule and an invalid rule. Consequently, an actual flow control effect of the packet switching device is different from that is expected by the administrator. Therefore, the embodiments of the present disclosure provide a flow control method to avoid occurrence of a redundant rule and an invalid rule and improve accuracy of flow control.

Figure 2:
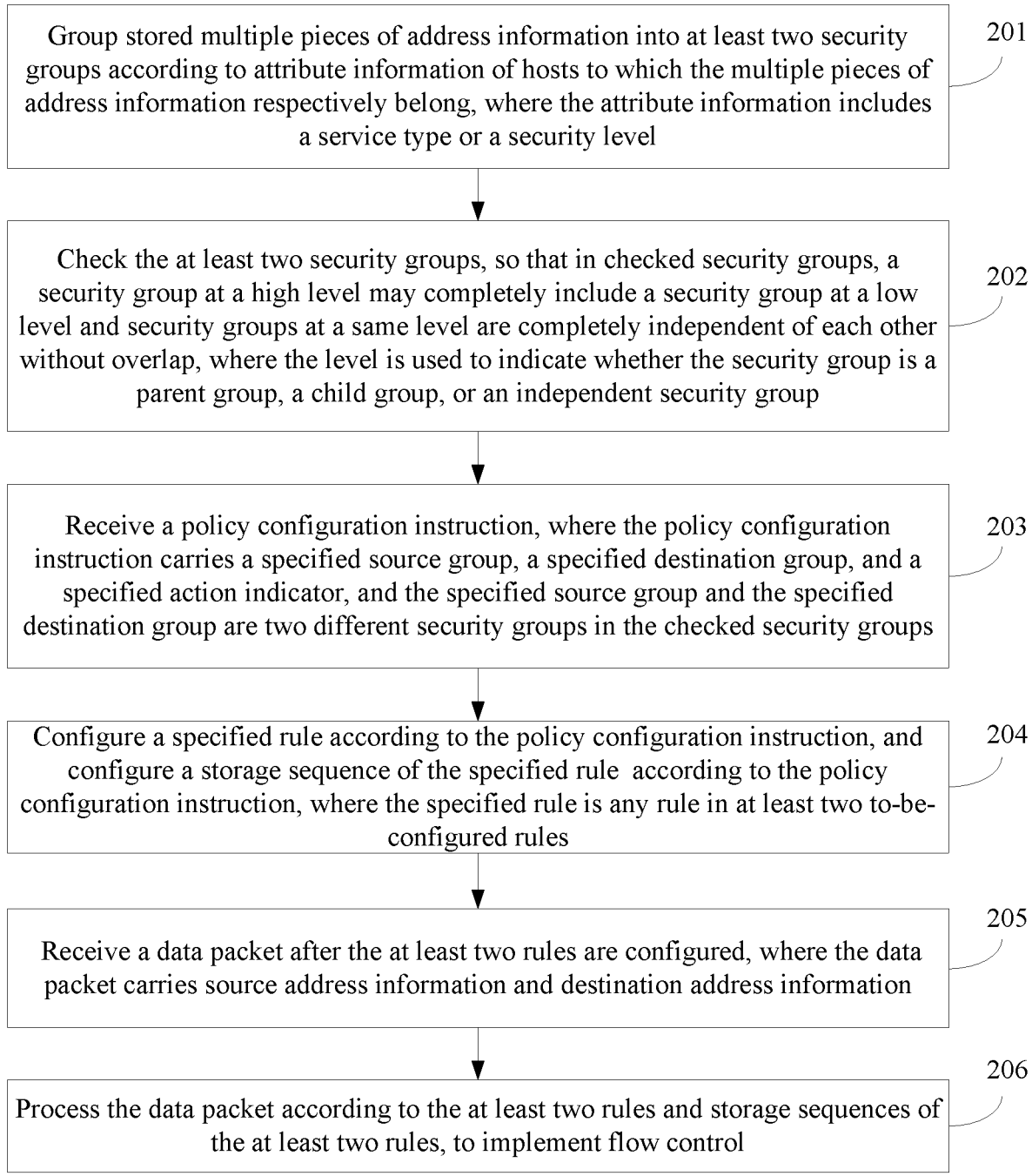
FIG. 2 is a flowchart of a flow control method according to an embodiment of the present disclosure.

FIG. 2 is a flowchart of a flow control method according to an embodiment of the present disclosure. Referring to FIG. 2, the method is applied to a packet switching device and includes the following steps.

Step 201: Group stored multiple pieces of address information into at least two security groups according to attribute information of hosts to which the multiple pieces of address information respectively belong, where the attribute information includes a service type or a security level.

Step 202: Arrange the at least two security groups, so that in arranged security groups, a security group at a high level may completely include a security group at a low level and security groups at a same level are completely independent of each other without overlap, where the level is used to indicate whether the security group is a parent group, a child group, or an independent security group.

Step 203: Receive a policy configuration instruction, where the policy configuration instruction carries a specified source group, a specified destination group, and a specified action indicator, and the specified source group and the specified destination group are two different security groups in the arranged security groups.

Step 204: Configure a specified rule according to the policy configuration instruction, and configure a storage sequence of the specified rule according to the policy configuration instruction, where the specified rule is any rule in at least two to-be-configured rules.

Step 205: Receive a data packet after the at least two rules are configured, where the data packet carries source address information and destination address information.

Step 206: Process the data packet according to the at least two rules and storage sequences of the at least two rules, to implement flow control.

In this embodiment of the present disclosure, the stored multiple pieces of address information are grouped into the at least two security groups according to the attribute information of the hosts to which the multiple pieces of address information belong, and the at least two security groups are arranged, so that in the arranged security groups, the security group at a high level may completely include the security group at a low level and the security groups at a same level are completely independent of each other without overlap. Further, the policy configuration instruction is received, and the policy configuration instruction carries the specified source group, the specified destination group, and the specified action indicator. In addition, the specified rule and the storage sequence of the specified rule are configured according to the policy configuration instruction. Therefore, occurrence of a redundant rule and an invalid rule can be avoided, and accuracy of flow control is improved. In addition, when the data packet is received, the data packet is processed according to storage sequences of rules. Therefore, time spent on matching a rule is reduced, and efficiency of flow control is improved.

Optionally, the arranging the at least two security groups includes determining whether an inclusion relationship or an overlap relationship exists between a first security group and multiple second security groups, where the first security group is an unarranged security group in the at least two security groups, the multiple second security groups are the arranged security groups in the at least two security groups, the inclusion relationship means that the first security group is a subset of the second security group or that the second security group is a subset of the first security group, and the overlap relationship means that an intersection exists between the first security group and the second security group and that the first security group is unequal to the second security group; if an inclusion relationship exists between the first security group and at least two second security groups in the multiple second security groups, determining a security group from the at least two second security groups as a third security group; displaying first acknowledgement prompt information, where the first acknowledgement prompt information is used to prompt an administrator to process an inclusion relationship between the first security group and the third security group; and if a first processing instruction is received according to the first acknowledgement prompt information, processing the inclusion relationship between the first security group and the third security group according to the first processing instruction.

Optionally, the determining a security group from the at least two second security groups as a third security group includes, if the first security group is included in all security groups in the at least two second security groups, selecting, from the at least two second security groups, a security group having a smallest address range; or if the first security group includes all security groups in the at least two second security groups, selecting, from the at least two second security groups, a security group having a largest address range; or if the first security group is included in at least one second security group in the at least two second security groups, and the first security group further includes a remaining second security group in the at least two second security groups, selecting, from the at least one second security group, a security group having a smallest address range, or selecting, from the remaining second security group, a security group having a largest address range; and determining the selected security group as the third security group.

Optionally, the processing the inclusion relationship between the first security group and the third security group according to the first processing instruction includes determining, from the first security group and the third security group, a security group having a larger address range as a fourth security group; and determining, from the first security group and the third security group, a security group having a smaller address range as a fifth security group; if the first processing instruction is a first split instruction, removing, from the fourth security group, address information the same as that in the fifth security group to obtain a first child security group; and if the first processing instruction is an inheritance instruction, setting the fifth security group as a secondary security group, and setting the fifth security group as a child group of the fourth security group, where the secondary security group is a security group that has an inclusion relationship with another security group in the arranged security groups.

Optionally, after the determining whether an inclusion relationship or an overlap relationship exists between a first security group and multiple second security groups, the method further includes, if an overlap relationship exists between the first security group and at least two second security groups in the multiple second security groups, selecting a security group from the at least two second security groups as a sixth security group; displaying second acknowledgement prompt information, where the second acknowledgement prompt information is used to prompt the administrator to process an overlap relationship between the first security group and the sixth security group; and if a second processing instruction is received according to the second acknowledgement prompt information, processing the overlap relationship between the first security group and the sixth security group according to the second processing instruction.

Optionally, the processing the overlap relationship between the first security group and the sixth security group according to the second processing instruction includes, if the second processing instruction is an instruction for retaining an old group, grouping, into a second child security group, address information that is in the first security group and that is the same as that in the sixth security group, and grouping, into a third child security group, other address information in the first security group than that in the second child security group; and setting the second child security group as a secondary security group, and setting the second child security group as a child group of the sixth security group.

Optionally, the processing the overlap relationship between the first security group and the sixth security group according to the second processing instruction includes, if the second processing instruction is an instruction for retaining a new group, grouping, into a fourth child security group, address information that is in the sixth security group and that is the same as that in the first security group, and grouping, into a fifth child security group, other address information in the sixth security group than that in the fourth child security group; and setting the fourth child security group as a secondary security group, and setting the fourth child security group as a child group of the first security group.

Optionally, the processing the overlap relationship between the first security group and the sixth security group according to the second processing instruction includes, if the second processing instruction is a second split instruction, respectively grouping, into three security groups, same address information in the first security group and the sixth security group, other address information in the first security group than the address information the same as that in the sixth security group, and other address information in the sixth security group than the address information the same as that in the first security group.

Optionally, the configuring a specified rule according to the policy configuration instruction includes, if both the specified source group and the specified destination group are primary security groups, configuring the specified rule according to the specified source group, the specified destination group, and the specified action indicator, where the primary security group is an independent security group that has no inclusion relationship or overlap relationship with another security group in the arranged security groups.

Optionally, the configuring a specified rule according to the policy configuration instruction, and configuring a storage sequence of the specified rule according to the policy configuration instruction includes, if the specified source group or the specified destination group is a secondary security group, determining whether a first rule is configured, where the first rule is a rule between a parent group of the specified source group and the specified destination group, a rule between the specified source group and a parent group of the specified destination group, or a rule between a parent group of the specified source group and a parent group of the specified destination group; if the first rule is configured, determining whether the specified action indicator is the same as an action indicator included in the first rule; and forbidding configuring of the specified rule if the specified action indicator is the same as the action indicator included in the first rule.

Optionally, after the determining whether the specified action indicator is the same as an action indicator included in the first rule, the method further includes, if the specified action indicator conflicts with the action indicator included in the first rule, configuring the specified rule according to the specified source group, the specified destination group, and the specified action indicator; and setting that the storage sequence of the specified rule precedes that of the first rule.

Optionally, after the forbidding configuring of the specified rule, the method further includes displaying "configuration forbidden" prompt information to prompt the administrator that configuring of the specified rule is forbidden and that the specified rule is a redundant rule.

Optionally, the configuring a specified rule according to the policy configuration instruction, and configuring a storage sequence of the specified rule according to the policy configuration instruction includes determining whether a second rule is configured if the specified source group is a secondary security group and the specified destination group is a parent group of a seventh security group, or if the specified source group is a parent group of an eighth security group and the specified destination group is a secondary security group, where when the specified source group is the secondary security group, and the specified destination group is the parent group of the seventh security group, the second rule is a rule between a parent group of the specified source group and the specified destination group or a rule between the specified source group and the seventh security group; or when the specified source group is the parent group of the eighth security group, and the specified destination group is the secondary security group, the second rule is a rule between the specified source group and the specified destination group or a rule between the eighth security group and a parent group of the specified destination group, where the seventh security group and the eighth security group are any security groups in the arranged security groups; if the second rule is configured, determining whether the specified action indicator is the same as an action indicator included in the second rule; and if the specified action indicator is the same as the action indicator included in the second rule, configuring the specified rule according to the specified source group, the specified destination group, and the specified action indicator.

Optionally, after the determining whether the specified action indicator is the same as an action indicator included in the second rule, the method further includes, if the specified action indicator conflicts with the action indicator included in the second rule, displaying policy conflict prompt information to prompt the administrator to set storage sequences of the specified rule and the second rule; and when a sorting operation of the administrator is received, setting the storage sequences of the specified rule and the second rule according to the sorting operation.

All the foregoing optional technical solutions may be randomly combined to form optional embodiments of the present disclosure. This is not described in detail in this embodiment of the present disclosure.

Figure 3:
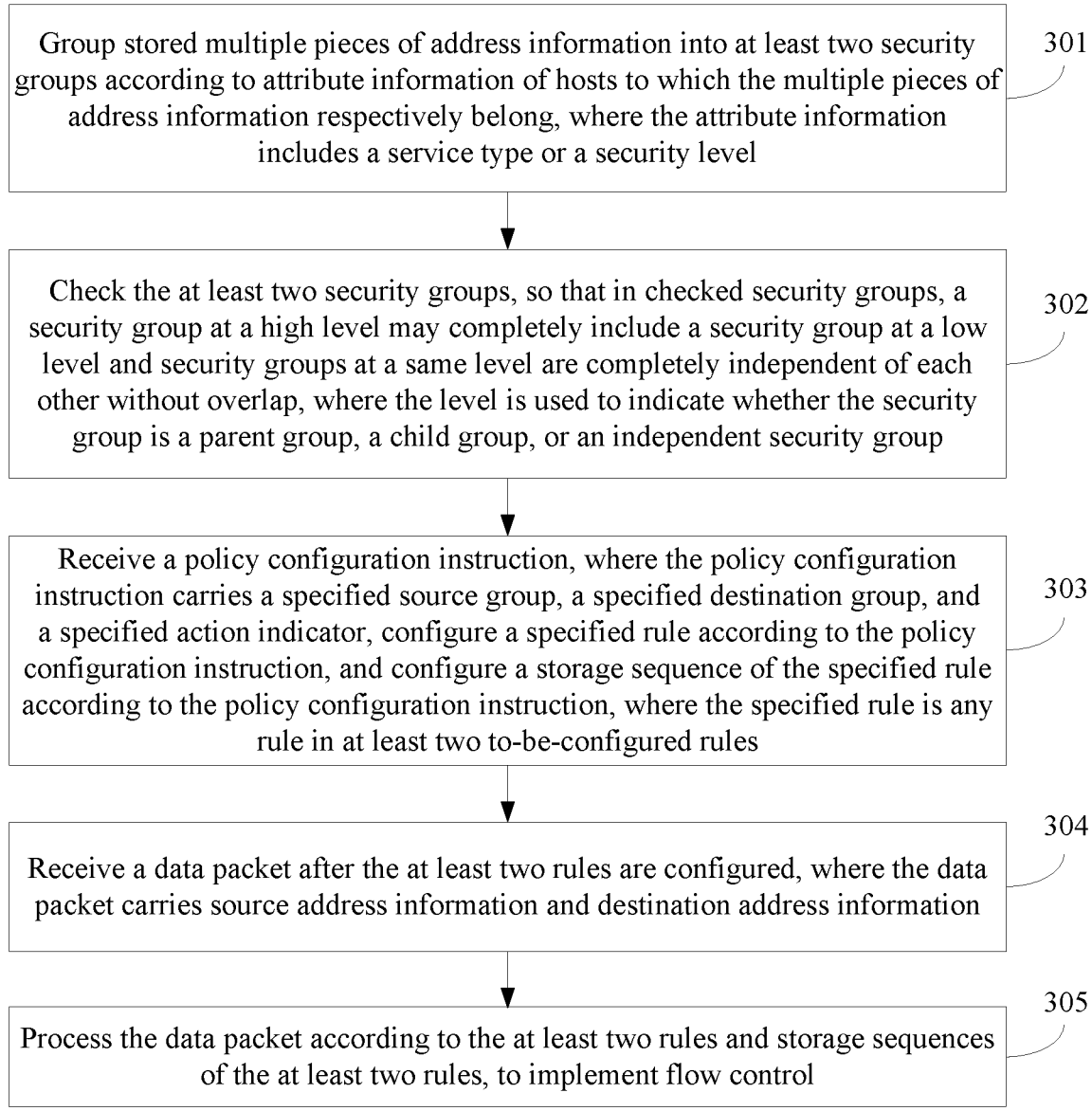
FIG. 3 is a flowchart of another flow control method according to an embodiment of the present disclosure.

FIG. 3 is a flowchart of a flow control method according to an embodiment of the present disclosure. Referring to FIG. 3, the method includes the following steps.

Before performing flow control, a packet switching device needs to configure at least two rules for performing flow control and storage sequences of the at least two rules. A method for configuring the at least two rules and the storage sequences of the at least two rules may include the following step 301 to step 303.

Step 301: Group stored multiple pieces of address information into at least two security groups according to attribute information of hosts to which the multiple pieces of address information respectively belong, where the attribute information includes a service type or a security level.

The stored multiple pieces of address information may be address information for which flow control needs to be performed, and the address information not only may include an IP address, but certainly may include a port number. This is not specifically limited in this embodiment of the present disclosure. In addition, when grouping the multiple pieces of address information into multiple security groups, the packet switching device may obtain a service type of a host to which each piece of address information belongs, and group the multiple pieces of address information into the at least two security groups according to the obtained service type, so that after the grouping, each security group includes address information corresponding to a same service type. Certainly, in an actual application, the packet switching device may group the multiple pieces of address information into security groups in other manners, for example, may perform grouping according to a security level of the host to which each piece of address information belongs. This is not specifically limited in this embodiment of the present disclosure.

It should be noted that, in this embodiment of the present disclosure, the host may be a device such as a server or a terminal that performs network communication. This is not specifically limited in this embodiment of the present disclosure.

Step 302: Arrange the at least two security groups, so that in arranged security groups, a security group at a high level may completely include a security group at a low level and security groups at a same level are completely independent of each other without overlap, where the level is used to indicate whether the security group is a parent group, a child group, or an independent security group.

Figure 4:
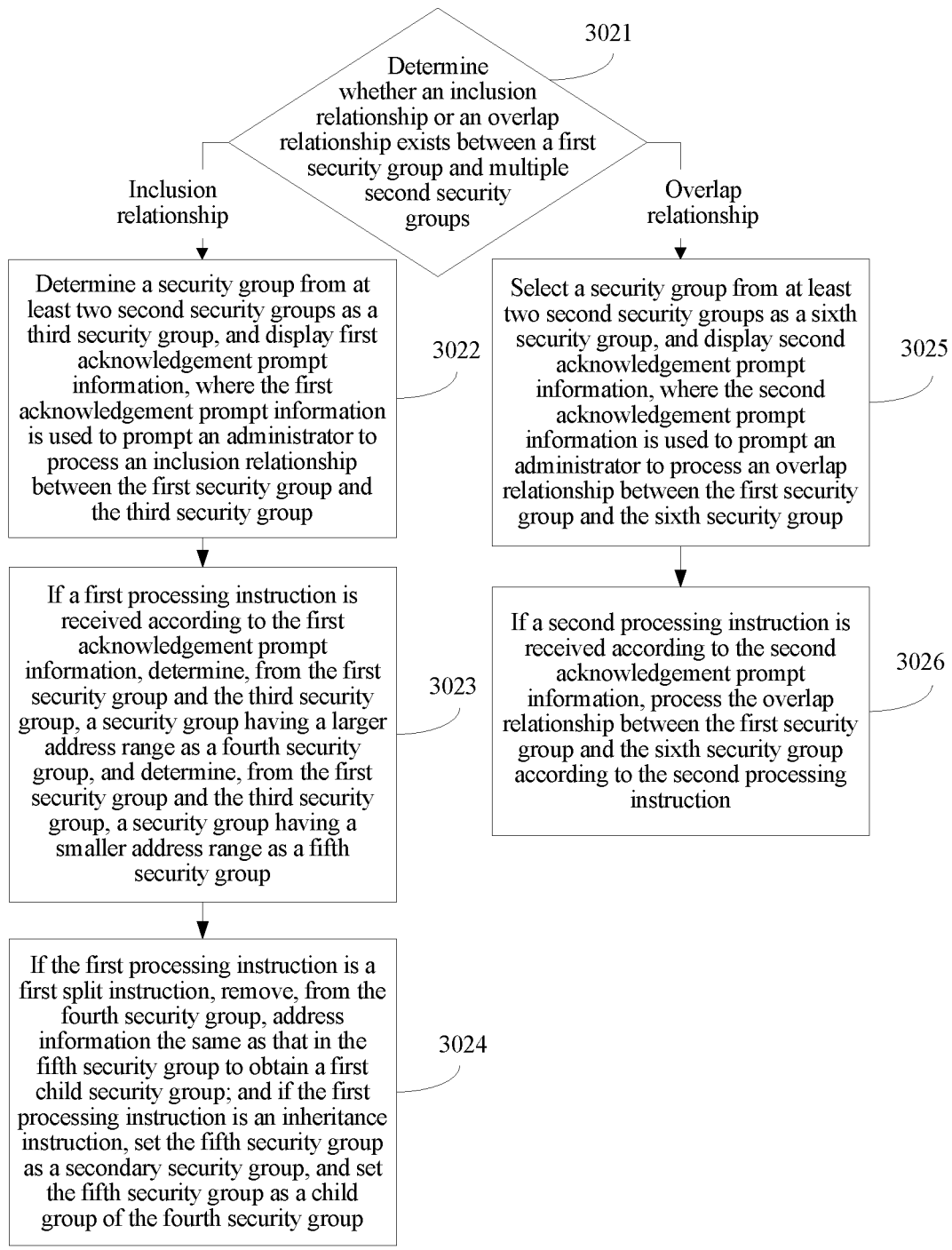
FIG. 4 is a flowchart of arranging at least two security groups according to an embodiment of the present disclosure.

When a rule for performing flow control is configured, because a redundant rule and an invalid rule provide no function in flow control, to avoid occurrence of the redundant rule and the invalid rule, the at least two security groups may be arranged. As shown in FIG. 4, the arranging the at least two security groups may include the following step 3021 to step 3026.

Step 3021: Determine whether an inclusion relationship or an overlap relationship exists between a first security group and multiple second security groups; and perform step 3022 if an inclusion relationship exists between the first security group and at least two second security groups in the multiple second security groups; or perform step 3025 if an overlap relationship exists between the first security group and at least two second security groups in the multiple second security groups, where the first security group is an unarranged security group in the at least two security groups, the multiple second security groups are the arranged security groups in the at least two security groups, the inclusion relationship means that the first security group is a subset of the second security group or that the second security group is a subset of the first security group, and the overlap relationship means that an intersection exists between the first security group and the second security group and that the first security group is unequal to the second security group.

Each security group includes at least one piece of address information. Therefore, if whether an inclusion relationship exists between the first security group and the multiple second security groups is determined, an address range of the first security group may be determined according to address information included in the first security group, and address ranges of the multiple second security groups are respectively determined according to address information included in the multiple second security groups. The address range of the first security group is separately compared with the address ranges of the multiple second security groups. It is determined that an inclusion relationship exists between the first security group and the multiple second security groups if the address range of the first security group includes address ranges of the at least two second security groups in the multiple second security groups, or if address ranges of the at least two second security groups in the multiple second security groups include the address range of the first security group, or if the address range of the first security group is included in an address range of at least one second security group in the at least two second security groups and the address range of the first security group further includes an address range of a remaining second security group in the at least two second security groups; it is determined that no inclusion relationship exists between the first security group and the multiple second security groups if the address range of the first security group does not include address ranges of the at least two second security groups in the multiple second security groups, address ranges of the at least two second security groups in the multiple second security groups does not include the address range of the first security group, and the address range of the first security group is not included in an address range of at least one second security group in the at least two second security groups and the address range of the first security group does not include an address range of a remaining second security group in the at least two second security groups. If an intersection exists between the address range of the first security group and the address ranges of the at least two second security groups in the multiple second security groups, and the address range of the first security group is unequal to those of the at least two second security groups, it is determined that an overlap relationship exists between the first security group and the multiple second security groups; it is determined that no overlap relationship exists between the first security group and the multiple second security groups if no intersection exists between the address range of the first security group and the address ranges of the at least two second security groups in the multiple second security groups, or the address range of the first security group is equal to those of the at least two second security groups.

For example, the address range of the first security group is 10.1.1.0 to 10.1.1.255, the multiple second security groups are respectively a security group A and a security group B, an address range of the security group A is 10.1.1.0 to 10.1.1.127, and an address range of the security group B is 10.1.1.0 to 10.1.1.32. Because the address range 10.1.1.0 to 10.1.1.255 of the first security group includes the address range 10.1.1.0 to 10.1.1.127 of the security group A, and the address range of the first security group further includes the address range 10.1.1.0 to 10.1.1.32 of the security group B, an inclusion relationship exists between the first security group and the multiple second security groups.

For another example, the address range of the first security group is 10.1.1.3/32, 10.1.1.4/32, and 10.1.1.5/32, the multiple second security groups are respectively a security group A and a security group B, an address range of the security group A is 10.1.1.5/32 and 10.1.1.6/32, and an address range of the security group B is 10.1.1.3/32, 10.1.1.5/32, and 10.1.1.6/32. An intersection address 10.1.1.5/32 exists between the first security group and each of the security group A and the security group B, and the address range of the first security group is unequal to the address range of the security group A, and the address range of the first security group is also unequal to the address range of the security group B. Therefore, an overlap relationship exists between the first security group and the multiple second security groups.

It should be noted that, an address range of a security group is a range covered by address information included in the security group. This is not specifically limited in this embodiment of the present disclosure.

In addition, a device that configures the at least two rules for performing flow control and the storage sequences of the at least two rules may be the packet switching device, or certainly may be a device other than the packet switching device. In this embodiment of the present disclosure, an example in which the device that configures the at least two rules and the storage sequences of the at least two rules is the packet switching device is used for description, and the packet switching device may be a network device such as a switch or a router. This is not specifically limited in this embodiment of the present disclosure.

Step 3022: Determine a security group from the at least two second security groups as a third security group, and display first acknowledgement prompt information, where the first acknowledgement prompt information is used to prompt an administrator to process an inclusion relationship between the first security group and the third security group.

If an inclusion relationship exists between the first security group and the at least two second security groups in the multiple second security groups, because there may multiple manners of processing the inclusion relationship, and an inclusion relationship may also exist between the at least two second security groups, to meet a requirement for performing flow control by the administrator, the packet switching device may determine a security group from the at least two second security groups as the third security group, and display the first acknowledgement prompt information, so that the administrator processes the inclusion relationship according to the first acknowledgement prompt information.

For example, the first security group is a security group C, and the third security group is a security group A. The packet switching device may display the first acknowledgement prompt information shown in FIG. 5, and the first acknowledgement prompt information may include a split button and an inheritance button. When the administrator presses the split button, a first split instruction may be triggered, and the first split instruction is used to split a security group into two child security groups. When the administrator presses the inheritance button, an inheritance instruction may be triggered, and the inheritance instruction is used to set a security group as a child group of another security group.

The operation of determining, by the packet switching device, a security group from the at least two second security groups as the third security group may be, if the first security group is included in all security groups in the at least two second security groups, selecting, from the at least two second security groups, a security group having a smallest address range; or if the first security group includes all security groups in the at least two second security groups, selecting, from the at least two second security groups, a security group having a largest address range; or if the first security group is included in at least one second security group in the at least two second security groups, and the first security group further includes a remaining second security group in the at least two second security groups, selecting, from the at least one second security group, a security group having a smallest address range, or selecting, from the remaining second security group other than the at least one second security group in the at least two second security groups, a security group having a largest address range; and determining the selected security group as the third security group.

For example, the first security group includes all the security groups in the at least two second security groups, the address range of the first security group is 10.1.1.0 to 10.1.1.255, the at least two second security groups are respectively a security group A and a security group B, an address range of the security group A is 10.1.1.0 to 10.1.1.127, and an address range of the security group B is 10.1.1.0 to 10.1.1.32. Because the address range of the security group A is greater than the address range of the security group B, the security group A is selected from the at least two second security groups and the security group A is determined as the third security group.

Further, when no inclusion relationship or overlap relationship exists between the first security group and the multiple second security groups, the first security group is directly set as a primary security group. The primary security group is an independent security group that has no inclusion relationship or overlap relationship with another security group in the arranged security groups.

Step 3023: If a first processing instruction is received according to the first acknowledgement prompt information, determine, from the first security group and the third security group, a security group having a larger address range as a fourth security group, and determine, from the first security group and the third security group, a security group having a smaller address range as a fifth security group.

Because an inclusion relationship exists between the first security group and the third security group, to process the inclusion relationship, the packet switching device needs to determine, from the first security group and the third security group, a security group as the fourth security group, and use the other security group in the first security group and the third security group as the fifth security group. When determining the fourth security group and the fifth security group, the packet switching device may select, according to the address range of the first security group and an address range of the third security group, a security group having a larger address range, determine the selected security group as the fourth security group, and determine the unselected security group as the fifth security group.

For example, as shown in FIG. 6, an inclusion relationship exists between a security group C and a security group A, an address range of the security group C is 10.1.1.0 to 10.1.1.255, and an address range of the security group A is 10.1.1.0 to 10.1.1.127. In this case, the security group C includes the security group A. Therefore, the security group C having a larger address range may be selected, the selected security group C is determined as the fourth security group, and the unselected security group A is determined as the fifth security group.

It should be noted that, the first processing instruction may include the first split instruction and the inheritance instruction, and the first processing instruction may be triggered by the administrator. The administrator may trigger the instruction by means of a specified operation. The specified operation may include an operation of pressing a corresponding button, or may include a sliding operation, a voice operation, or the like. This is not specifically limited in this embodiment of the present disclosure.

Step 3024: If the first processing instruction is a first split instruction, remove, from the fourth security group, address information the same as that in the fifth security group to obtain a first child security group; and if the first processing instruction is an inheritance instruction, set the fifth security group as a secondary security group, and set the fifth security group as a child group of the fourth security group, where the secondary security group is a security group that has an inclusion relationship with another security group in the arranged security groups.

It should be noted that, when the first processing instruction is the first split instruction, if the fourth security group is the third security group, because the first child security group includes other address information in the fourth security group than the address information the same as that in the fifth security group, it may be set that a level of the first child security group is the same as a level of the fourth security group.

The setting the fifth security group as a child group of the fourth security group is setting the fourth security group as a parent group of the fifth security group. In this case, a relationship between the fourth security group and the fifth security group is a relationship between a parent group and a child group, and the child group may inherit a rule of the parent group. Therefore, repeated configuration operations of the administrator are reduced, and efficiency of configuring a rule and a storage sequence of the rule is improved.

For example, as shown in FIG. 7A, a security group C includes a security group A, an address range of the security group C is 10.1.1.0 to 10.1.1.255, and an address range of the security group A is 10.1.1.0 to 10.1.1.127. If the first processing instruction is the first split instruction, the packet switching device may remove, from the security group C, address information the same as that in the security group A to obtain a first child security group a1, and an address range of the first child security group a1 is 10.1.1.128 to 10.1.1.255.

For another example, as shown in FIG. 7B, if the first processing instruction is the inheritance instruction, the packet switching device may set the security group A as a secondary security group, and set the security group A as a child group of the security group C.

Further, when the first processing instruction is the first split instruction, if the fourth security group is the first security group, after the packet switching device removes, from the fourth security group, the address information the same as that in the fifth security group to obtain the first child security group, the packet switching device may further store the first child security group in the multiple second security groups to update the multiple second security groups. However, if the fourth security group is the third security group, the packet switching device may replace the third security group in the multiple second security groups with the first child security group to update the multiple second security groups. When the first processing instruction is the inheritance instruction, if the fourth security group is the first security group, the packet switching device may directly store the fourth security group in the multiple second security groups to update the multiple second security groups. If the fourth security group is the third security group, the packet switching device may store the fifth security group in the multiple second security groups to update the multiple second security groups.

It should be noted that, if the first security group is included in the at least one second security group in the at least two second security groups, and the first security group further includes the remaining second security group in the at least two second security groups, after the packet switching device processes the inclusion relationship between the first security group and the third security group according to the first processing instruction, the packet switching device may further use a security group obtained after the inclusion relationship processing as the first security group, and go back to perform the foregoing step 3021 again.

Step 3025: Select a security group from the at least two second security groups as a sixth security group, and display second acknowledgement prompt information, where the second acknowledgement prompt information is used to prompt the administrator to process an overlap relationship between the first security group and the sixth security group.

Whether an inclusion relationship exists between the at least two second security groups is determined. If an inclusion relationship exists between the at least two second security groups, a second security group having a smallest address range may be selected from the at least two second security groups, and the selected second security group is determined as the sixth security group. If no inclusion relationship exists between the at least two second security groups, the packet switching device may randomly select a second security group from the at least two second security groups, and determine the selected second security group as the sixth security group.

For example, the at least two second security groups are respectively a security group A and a security group B, an address range of the security group A is 10.1.1.5/32 and 10.1.1.6/32, and an address range of the security group B is 10.1.1.3/32, 10.1.1.5/32, and 10.1.1.6/32. In this case, the security group B includes the security group A. Therefore, the security group A having a smaller address range may be selected, and the security group A is determined as the sixth security group.

Step 3026: If a second processing instruction is received according to the second acknowledgement prompt information, process the overlap relationship between the first security group and the sixth security group according to the second processing instruction.

It should be noted that, the second processing instruction may include an instruction for retaining an old group, an instruction for retaining a new group, or a second split instruction, and the second processing instruction may be triggered by the administrator. The administrator may trigger the instruction by means of a specified operation. This is not specifically limited in this embodiment of the present disclosure.

Because the second processing instruction includes the instruction for retaining an old group, the instruction for retaining a new group, or the second split instruction, there may include three manners of processing the overlap relationship. Further, there may include three cases when the overlap relationship between the first security group and the sixth security group is processed according to the second processing instruction.

Case 1: If the second processing instruction is the instruction for retaining an old group, address information that is in the first security group and that is the same as that in the sixth security group is grouped into a second child security group, and other address information in the first security group than that in the second child security group is grouped into a third child security group; and the second child security group is set as a secondary security group, and the second child security group is set as a child group of the sixth security group.

It should be noted that, the instruction for retaining an old group is used to retain integrity of the sixth security group, and split the first security group.

For example, as shown in FIG. 8A, the first security group is a security group C, and an address range of the security group C is 10.1.1.3/32, 10.1.1.4/32, and 10.1.1.5/32; the sixth security group is a security group A, and an address range of the security group A is 10.1.1.5/32 and 10.1.1.6/32. When the second processing instruction is the instruction for retaining an old group, address information that is in the security group C and that is the same as that in the security group A is grouped into a second child security group a2, and an address range of the second child security group a2 is 10.1.1.5/32; other address information in the security group C than that in the second child security group a2 is grouped into a third child security group a3, and an address range of the third child security group a3 is 10.1.1.3/32 and 10.1.1.4/32; and the second child security group a2 is set as a secondary security group, and the second child security group a2 is set as a child group of the sixth security group A.

Further, the packet switching device may update the multiple second security groups according to the second child security group, the third child security group, and the sixth security group. The packet switching device stores the second child security group and the third child security group in the multiple second security groups to update the multiple second security groups.

Case 2: If the second processing instruction is the instruction for retaining a new group, address information that is in the sixth security group and that is the same as that in the first security group is grouped into a fourth child security group, and other address information in the sixth security group than that in the fourth child security group is grouped into a fifth child security group; and the fourth child security group is set as a secondary security group, and the fourth child security group is set as a child group of the first security group.

The fifth child security group includes the other address information in the sixth security group than the address information the same as that in the first security group. Therefore, it may be set that a level of the fifth child security group is the same as a level of the sixth security group.

It should be noted that, the instruction for retaining a new group is used to retain integrity of the first security group, and split the sixth security group.

For example, as shown in FIG. 8B, the first security group is a security group C, and an address range of the security group C is 10.1.1.3/32, 10.1.1.4/32, and 10.1.1.5/32; the sixth security group is a security group A, and an address range of the security group A is 10.1.1.5/32 and 10.1.1.6/32. If the second processing instruction is the instruction for retaining a new group, address information that is in the security group A and that is the same as that in the security group C is grouped into a fourth child security group c1, and an address range of the fourth child security group c1 is 10.1.1.5/32; other address information in the security group A than that in the fourth child security group c1 is grouped into a fifth child security group, and an address range of the fifth child security group is 10.1.1.6/32; and the fourth child security group c1 is set as a secondary security group, and the fourth child security group c1 is set as a child group of the security group C.

Further, the packet switching device may update the multiple second security groups according to the fourth child security group, the fifth child security group, and the first security group. The packet switching device replaces the sixth security group in the multiple second security groups with the fourth child security group and the fifth child security group, and stores the first security group in the multiple second security groups to update the multiple second security groups.

Case 3: If the second processing instruction is the second split instruction, same address information in the first security group and the sixth security group, other address information in the first security group than the address information the same as that in the sixth security group, and other address information in the sixth security group than the address information the same as that in the first security group are respectively grouped into three security groups.

It should be noted that, the second split instruction is used to respectively group, into the three security groups, the same address information in the first security group and the sixth security group, the other address information in the first security group than the address information the same as that in the sixth security group, and the other address information in the sixth security group than the address information the same as that in the first security group.

For example, as shown in FIG. 8C, the first security group is a security group C, and an address range of the security group C is 10.1.1.3/32, 10.1.1.4/32, and 10.1.1.5/32; the sixth security group is a security group A, and an address range of the security group A is 10.1.1.5/32 and 10.1.1.6/32. If the second processing instruction is the second split instruction, same address information in the security group A and the security group C, other address information in the first security group C than the address information the same as that in the sixth security group, and other address information in the sixth security group A than the address information the same as that in the first security group are respectively grouped into three security groups. The three security groups are respectively security groups D, E, and F. An address range of the security group D is 10.1.1.5/32, an address range of the security group E is 10.1.1.3/32 and 10.1.1.4/32, and an address range of the security group F is 10.1.1.6/32.

Further, the packet switching device may update the multiple second security groups according to the three security groups obtained by means of grouping. The packet switching device replaces the sixth security group in the multiple second security groups with the three security groups to update the multiple second security groups.

Further, in this embodiment of the present disclosure, the packet switching device not only may process the overlap relationship between the first security group and the sixth security group in the foregoing three cases, but certainly may perform processing in other manners in an actual application. For example, the packet switching device may delete, from the first security group, the address information the same as that in the sixth security group; or the packet switching device may delete, from the sixth security group, the address information the same as that in the first security group. This is not specifically limited in this embodiment of the present disclosure.

It should be noted that, when no inclusion relationship exists between the at least two second security groups, after the packet switching device randomly selects a second security group from the at least two second security groups as the sixth security group, and after the packet switching device processes the overlap relationship between the first security group and the sixth security group according to the second processing instruction, the packet switching device may further use a security group obtained after the overlap relationship processing as the first security group, and go back to perform the foregoing step 3021 again.

Step 303: Receive a policy configuration instruction, where the policy configuration instruction carries a specified source group, a specified destination group, and a specified action indicator, configure a specified rule according to the policy configuration instruction, and configure a storage sequence of the specified rule according to the policy configuration instruction, where the specified rule is any rule in at least two to-be-configured rules.

After the at least two security groups obtained by means of grouping are arranged in the foregoing step 302, it is ensured that in the arranged security groups, the security group at a high level may completely include the security group at a low level and that the security groups at a same level are completely independent of each other without overlap. Therefore, the packet switching device may display the arranged security groups. When receiving a source group selection instruction according to the displayed security groups, the packet switching device determines a security group carried in the source group selection instruction as the specified source group. When receiving a destination group selection instruction according to the displayed security groups, the packet switching device determines a security group carried in the destination group selection instruction as the specified destination group.

It should be noted that, the source group selection instruction is used to select the specified source group from the displayed security groups, and the destination group selection instruction is used to select the specified destination group from the displayed security groups. The policy configuration instruction is used to configure a specified policy for the specified source group and the specified destination group, so as to generate the specified rule. In addition, the source group selection instruction, the destination group selection instruction, and the policy configuration instruction all may be triggered by the administrator, and the administrator may trigger the instructions by means of a specified operation. This is not specifically limited in this embodiment of the present disclosure.

The specified source group and the specified destination group not only may be in a relationship between mutually independent security groups, but also may be in a relationship between a child group and a parent group. A method for configuring the specified rule according to the specified source group, the specified destination group, and the specified action indicator, and configuring the storage sequence of the specified rule may include the following three cases.

Case 1: When both the specified source group and the specified destination group are primary security groups, the specified rule is configured according to the specified source group, the specified destination group, and the specified action indicator, and the storage sequence of the specified rule is configured.

When both the specified source group and the specified destination group are primary security groups, it is determined that the specified source group and the specified destination group are mutually independent security groups, and a redundant rule or an invalid rule does not exist. In this case, the packet switching device may directly configure the specified rule according to the specified source group, the specified destination group, and the specified action indicator, and configure the storage sequence of the specified rule.

For example, an address range of a security group E is 10.1.1.0/24, an address range of a security group F is 10.1.2.0/24, and both the security group E and the security group F are primary security groups. In this case, the administrator may configure the specified rule. In the specified rule, the specified source group is the security group E, the destination group is the security group F, and the action indicator is "forbidden". That the action indicator is "forbidden" indicates that an address in the security group E is forbidden to access an address in the security group F.

It should be noted that, mutually independent security groups also form independent rules, but mutually independent rules have no sequence relationship, that is, storage sequences of the mutually independent rules has no impact on flow control. Therefore, in this embodiment of the present disclosure, the storage sequence of the specified rule not only may be configured according to a configuration time of the specified rule, but certainly may be configured in other manners in an actual application, for example, a random sequence. This is not specifically limited in this embodiment of the present disclosure.

Case 2: If the specified source group or the specified destination group is a secondary security group, whether a first rule is configured is determined. The first rule is a rule between a parent group of the specified source group and the specified destination group, a rule between the specified source group and a parent group of the specified destination group, or a rule between a parent group of the specified source group and a parent group of the specified destination group. If the first rule is configured, whether the specified action indicator is the same as an action indicator included in the first rule is determined, and configuring of the specified rule is forbidden if the specified action indicator is the same as the action indicator included in the first rule.

For example, an address range of a security group E is 10.1.1.0/25, a parent group of the security group E is a security group M, and an address range of the security group M is 10.1.1.0/24. An address range of a security group F is 10.1.2.0/25, a parent group of the security group F is a security group N, and an address range of the security group N is 10.1.2.0/24. When the administrator configures the specified rule for accessing the security group F by the security group E, whether the first rule is configured is determined. The first rule is a rule between the security group E and the security group N, a rule between the security group M and the security group F, or a rule between the security group M and the security group N. If the first rule is configured, whether the specified action indicator is the same as the action indicator included in the first rule is determined, and configuring of the specified rule is forbidden if the specified action indicator is the same as the action indicator included in the first rule.

Optionally, when determining that the specified action indicator is the same as the action indicator included in the first rule, the packet switching device determines that the specified rule is a redundant rule, and may further display "configuration forbidden" prompt information to prompt the administrator that configuring of the specified rule is forbidden and that the specified rule is a redundant rule.

Further, if the specified action indicator conflicts with the action indicator included in the first rule, the specified rule is configured according to the specified source group, the specified destination group, and the specified action indicator, and it is set that the storage sequence of the specified rule precedes that of the first rule. In this embodiment of this application, an example in which a rule ranks in the front in terms of storage sequence has a high priority is used for description. This aims to achieve better compatibility with a rule matching manner in an existing ACL.

If the first rule is configured and the specified action indicator is the same as the action indicator included in the first rule, because an address range of the specified rule is smaller than an address range of the first rule, and the address range of the specified rule is included in the address range of the first rule, it is determined that the address range of the specified rule in which the specified action indicator is located overlaps with that of the first rule, and it may be further determined that the specified rule is a redundant rule. However, if the first rule is configured and the specified action indicator conflicts with the action indicator included in the first rule, because the address range of the specified rule is smaller than the address range of the first rule, it needs to set that the storage sequence of the specified rule precedes that of the first rule; if it is set that a storage sequence of the first rule precedes that of the specified rule, the specified rule is an invalid rule.

Optionally, after it is set that the storage sequence of the specified rule precedes that of the first rule, sequence prompt information may be further displayed to prompt the administrator that the storage sequence of the specified rule precedes that of the first rule.

Case 3: Whether a second rule is configured is determined if the specified source group is a secondary security group and the specified destination group is a parent group of a seventh security group, or if the specified source group is a parent group of an eighth security group and the specified destination group is a secondary security group. When the specified source group is the secondary security group, and the specified destination group is the parent group of the seventh security group, the second rule is a rule between a parent group of the specified source group and the specified destination group or a rule between the specified source group and the seventh security group. When the specified source group is the parent group of the eighth security group, and the specified destination group is the secondary security group, the second rule is a rule between the specified source group and the specified destination group or a rule between the eighth security group and a parent group of the specified destination group. The seventh security group and the eighth security group are any security groups in the arranged security groups. If the second rule is configured, whether the specified action indicator is the same as an action indicator included in the second rule is determined. If the specified action indicator is the same as the action indicator included in the second rule, the specified rule is configured according to the specified source group, the specified destination group, and the specified action indicator, and the storage sequence of the specified rule is configured.

For example, an address range of a security group E is 10.1.1.0/25, a parent group of the security group E is a security group M, and an address range of the security group M is 10.1.1.0/24. An address range of a security group F is 10.1.2.0/25, a parent group of the security group F is a security group N, and an address range of the security group N is 10.1.2.0/24. When the administrator configures the specified rule for accessing the security group N by the security group E, whether the second rule is configured is determined. The second rule is a rule between the security group M and the security group N or a rule between the security group E and the security group F. If the second rule is configured, whether the specified action indicator is the same as the action indicator included in the second rule is determined. If the specified action indicator is the same as the action indicator included in the second rule, the specified rule is configured according to the security group E, the security group N, and the specified action indicator, and the storage sequence of the specified rule is configured.

Further, if the specified action indicator conflicts with the action indicator included in the second rule, policy conflict prompt information is displayed to prompt the administrator to set storage sequences of the specified rule and the second rule. When a sorting operation of the administrator is received, the storage sequences of the specified rule and the second rule are set according to the sorting operation.

If the specified action indicator is the same as the action indicator included in the second rule, it is determined that the specified rule and the second rule are also mutually independent rules. Therefore, in this embodiment of the present disclosure, the storage sequence of the specified rule not only may be configured according to a configuration time of the specified rule, but certainly may be configured in other manners in an actual application, for example, a random sequence. This is not specifically limited in this embodiment of the present disclosure.

It should be noted that, when the at least two rules are configured using the foregoing steps, a source group and a destination group in each rule not only may include some specified address information, but certainly may include all address information. That is, the source group and the destination group in each rule may limit address information, or certainly may not limit address information for which flow control needs to be performed, and include any address information. This is not specifically limited in this embodiment of the present disclosure.

After the at least two rules and the storage sequences of the at least two rules are configured according to the foregoing step 301 to step 303, flow control may be performed according to the configured at least two rules and the storage sequences of the at least two rules using methods in the following step 304 and step 305.

Step 304: Receive a data packet after the at least two rules are configured, where the data packet carries source address information and destination address information.

When communication is performed between two hosts and a communicated data packet is transmitted using the packet switching device, the packet switching device may receive the data packet, and perform flow control according to the data packet.

It should be noted that, the source address information is address information of a host that sends the data packet, and the destination address information is address information of a host that finally receives the data packet. In addition, both the source address information and the destination address information may include an IP address. Certainly, the source address information and the destination address information may include an IP address and a port number. This is not specifically limited in this embodiment of the present disclosure.

Step 305: Process the data packet according to the at least two rules and storage sequences of the at least two rules, to implement flow control.

The source address information and the destination address information carried in the data packet are successively compared with a match condition in the at least two rules according to the storage sequences of the at least two rules. If the source address information and the destination address information carried in the data packet are the same as the match condition in a currently compared rule, the currently compared rule is determined as a target rule; otherwise, the source address information and the destination address information carried in the data packet are compared with a match condition in a next rule in the at least two rules according to the storage sequences of the at least two rules, until a target rule is determined. Afterward, the packet switching device may process the data packet according to an action indicator included in the target rule, to implement flow control.

The action indicator generally includes blocking or passing. Therefore, when the action indicator included in the target rule is blocking, the packet switching device may discard the data packet, and does not send the data packet. When the action indicator included in the target rule is passing, the packet switching device may continue to send the data packet. Certainly, in an actual application, the action indicator may further include other policies. The policies are not listed one by one in this embodiment of the present disclosure.

It should be noted that, when the source group included in the rule includes some specified address information, but the destination group includes all address information, for example, when content of a destination group field in the rule is "any", it is determined that the destination address information in the data packet is not limited when flow control is performed. Likewise, when the source group included in the rule includes all address information, for example, when content of a source group field in the rule is "any", but the destination group includes some specified address information, it is determined that the source address information in the data packet is not limited when flow control is performed. However, when both the source group and the destination group included in the rule include some specified address information, it is determined that not only the source address information in the data packet but also the destination address information in the data packet needs to be limited when flow control is performed.

In this embodiment of the present disclosure, the stored multiple pieces of address information are grouped into the at least two security groups according to the attribute information of the hosts to which the multiple pieces of address information belong, and the at least two security groups are arranged, so that in the arranged security groups, the security group at a high level may completely include the security group at a low level and the security groups at a same level are completely independent of each other without overlap. In addition, in a rule configuration process, the storage sequence of the specified rule is determined according to a relationship between the specified source address information and the specified destination address information. Therefore, occurrence of a redundant rule and an invalid rule can be avoided, and accuracy of flow control is improved. In addition, when the data packet is received, the target rule that matches the source address information and the destination address information carried in the data packet is determined according to storage sequences of rules by means of sequential matching, and there is no need to match all the rules. Therefore, time spent on matching a rule is reduced, and efficiency of flow control is further improved.

Figure 9:
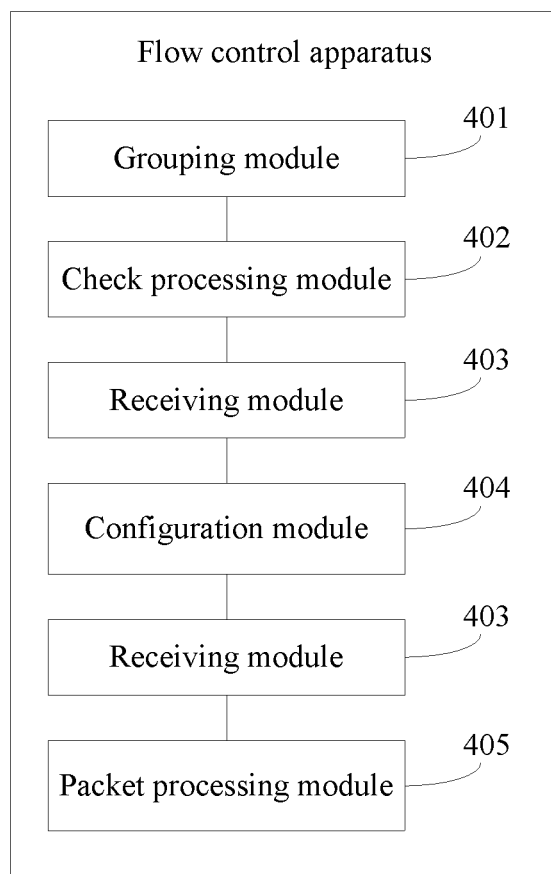
FIG. 9 is a schematic structural diagram of a flow control apparatus according to an embodiment of the present disclosure.

FIG. 9 is a schematic structural diagram of a flow control apparatus according to an embodiment of the present disclosure. Referring to FIG. 9, the apparatus includes a grouping module 401, adapted to group stored multiple pieces of address information into at least two security groups according to attribute information of hosts to which the multiple pieces of address information respectively belong, where the attribute information includes a service type or a security level; a arrange processing module 402, adapted to arrange the at least two security groups, so that in arranged security groups, a security group at a high level may completely include a security group at a low level and security groups at a same level are completely independent of each other without overlap, where the level is used to indicate whether the security group is a parent group, a child group, or an independent security group; a receiving module 403, adapted to receive a policy configuration instruction, where the policy configuration instruction carries a specified source group, a specified destination group, and a specified action indicator, and the specified source group and the specified destination group are two different security groups in the arranged security groups; a configuration module 404, adapted to configure a specified rule according to the policy configuration instruction, and configure a storage sequence of the specified rule according to the policy configuration instruction, where the specified rule is any rule in at least two to-be-configured rules; where the receiving module 403 is further adapted to receive a data packet after the at least two rules are configured, where the data packet carries source address information and destination address information; and a packet processing module 405, adapted to process the data packet according to the at least two rules and storage sequences of the at least two rules, to implement flow control.

Figure 10:
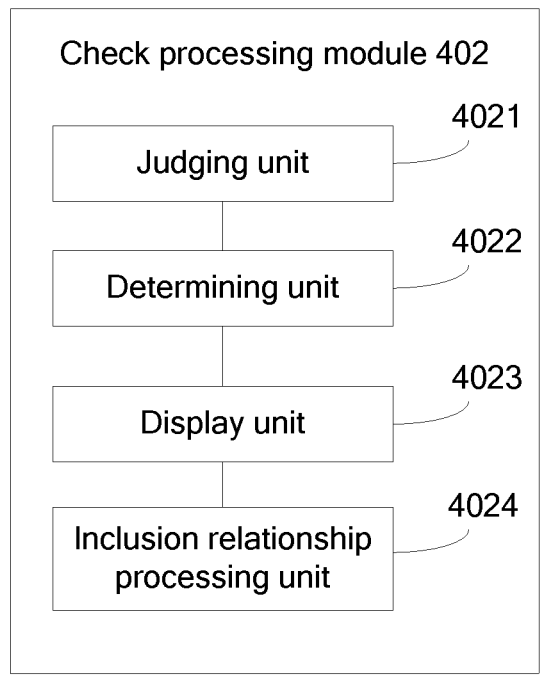
FIG. 10 is a schematic structural diagram of a arrange processing module according to an embodiment of the present disclosure.

Optionally, as shown in FIG. 10, the arrange processing module 402 includes a judging unit 4021, adapted to determine whether an inclusion relationship or an overlap relationship exists between a first security group and multiple second security groups, where the first security group is an unarranged security group in the at least two security groups, the multiple second security groups are the arranged security groups in the at least two security groups, the inclusion relationship means that the first security group is a subset of the second security group or that the second security group is a subset of the first security group, and the overlap relationship means that an intersection exists between the first security group and the second security group and that the first security group is unequal to the second security group; a determining unit 4022, adapted to, if an inclusion relationship exists between the first security group and at least two second security groups in the multiple second security groups, determine a security group from the at least two second security groups as a third security group; a display unit 4023, adapted to display first acknowledgement prompt information, where the first acknowledgement prompt information is used to prompt an administrator to process an inclusion relationship between the first security group and the third security group; and an inclusion relationship processing unit 4024, adapted to, if a first processing instruction is received according to the first acknowledgement prompt information, process the inclusion relationship between the first security group and the third security group according to the first processing instruction.

Figure 11:
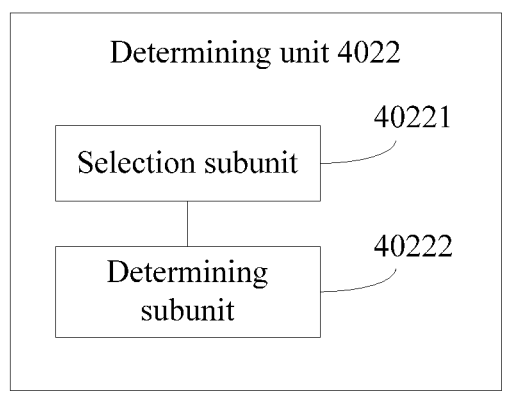
FIG. 11 is a schematic structural diagram of a determining unit according to an embodiment of the present disclosure.

Optionally, as shown in FIG. 11, the determining unit 4022 includes a selection subunit 40221, adapted to, if the first security group is included in all security groups in the at least two second security groups, select, from the at least two second security groups, a security group having a smallest address range; or if the first security group includes all security groups in the at least two second security groups, select, from the at least two second security groups, a security group having a largest address range; or if the first security group is included in at least one second security group in the at least two second security groups, and the first security group further includes a remaining second security group in the at least two second security groups, select, from the at least one second security group, a security group having a smallest address range, or select, from the remaining second security group, a security group having a largest address range; and a determining subunit 40222, adapted to determine the selected security group as the third security group.

Figure 12:
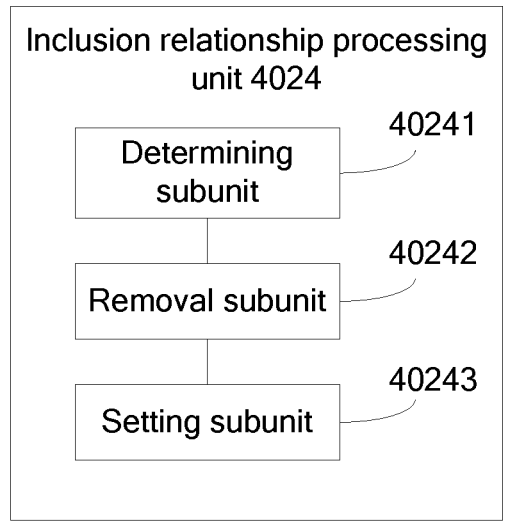
FIG. 12 is a schematic structural diagram of an inclusion relationship processing unit according to an embodiment of the present disclosure.

Optionally, as shown in FIG. 12, the inclusion relationship processing unit 4024 includes a determining subunit 40241, adapted to, if the first processing instruction is received according to the first acknowledgement prompt information, determine, from the first security group and the third security group and according to the first processing instruction, a security group having a larger address range as a fourth security group, and determine, from the first security group and the third security group, a security group having a smaller address range as a fifth security group; a removal subunit 40242, adapted to, if the first processing instruction is a first split instruction, remove, from the fourth security group, address information the same as that in the fifth security group to obtain a first child security group; and a setting subunit 40243, adapted to, if the first processing instruction is an inheritance instruction, set the fifth security group as a secondary security group, and set the fifth security group as a child group of the fourth security group, where the secondary security group is a security group that has an inclusion relationship with another security group in the arranged security groups.

Figure 13:
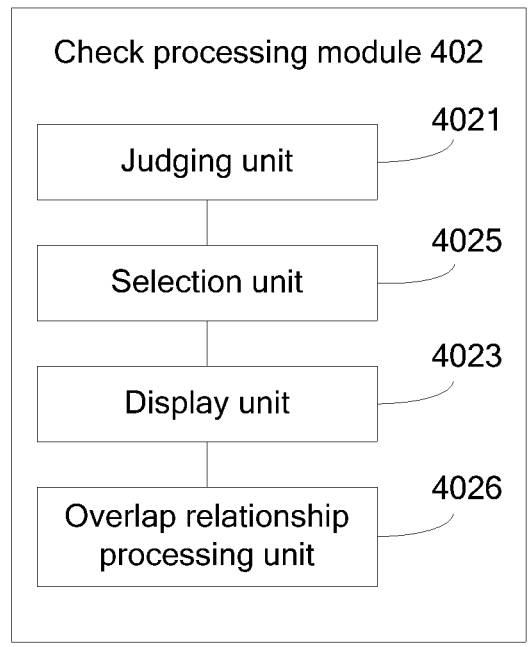
FIG. 13 is a schematic structural diagram of another arrange processing module according to an embodiment of the present disclosure.

Optionally, as shown in FIG. 13, the arrange processing module 402 further includes a selection unit 4025, adapted to, if an overlap relationship exists between the first security group and at least two second security groups in the multiple second security groups, select a security group from the at least two second security groups as a sixth security group; where the display unit 4023 is further adapted to display second acknowledgement prompt information, where the second acknowledgement prompt information is used to prompt the administrator to process an overlap relationship between the first security group and the sixth security group; and an overlap relationship processing unit 4026, adapted to, if a second processing instruction is received according to the second acknowledgement prompt information, process the overlap relationship between the first security group and the sixth security group according to the second processing instruction.

Figure 14:
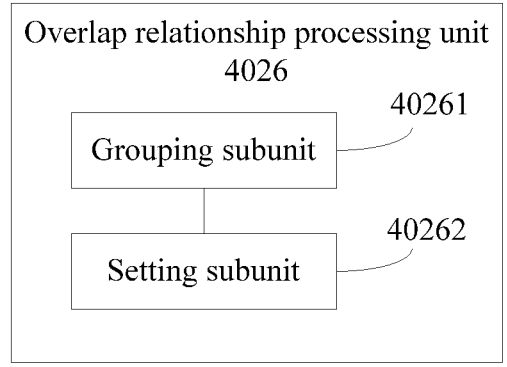
FIG. 14 is a schematic structural diagram of an overlap relationship processing unit according to an embodiment of the present disclosure.

Optionally, as shown in FIG. 14, the overlap relationship processing unit 4026 includes a grouping subunit 40261, adapted to, if the second processing instruction is received according to the second acknowledgement prompt information, and the second processing instruction is an instruction for retaining an old group, group, into a second child security group, address information that is in the first security group and that is the same as that in the sixth security group, and group, into a third child security group, other address information in the first security group than that in the second child security group; and a setting subunit 40262, adapted to set the second child security group as a secondary security group, and set the second child security group as a child group of the sixth security group.

Figure 15:
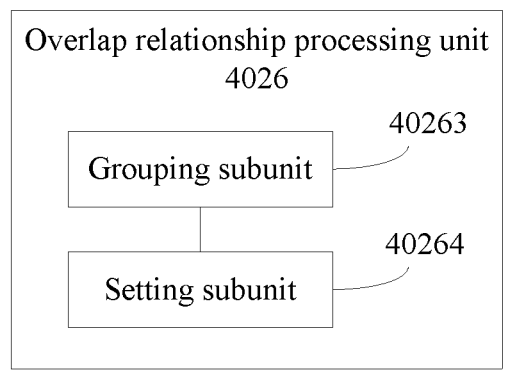
FIG. 15 is a schematic structural diagram of another overlap relationship processing unit according to an embodiment of the present disclosure.

Optionally, as shown in FIG. 15, the overlap relationship processing unit 4026 includes a grouping subunit 40263, adapted to, if the second processing instruction is received according to the second acknowledgement prompt information, and the second processing instruction is an instruction for retaining a new group, group, into a fourth child security group, address information that is in the sixth security group and that is the same as that in the first security group, and group, into a fifth child security group, other address information in the sixth security group than that in the fourth child security group; and a setting subunit 40264, adapted to set the fourth child security group as a secondary security group, and set the fourth child security group as a child group of the first security group.

Optionally, the overlap relationship processing unit 4026 includes a grouping subunit, adapted to, if the second processing instruction is received according to the second acknowledgement prompt information, and the second processing instruction is a second split instruction, respectively group, into three security groups, same address information in the first security group and the sixth security group, other address information in the first security group than the address information the same as that in the sixth security group, and other address information in the sixth security group than the address information the same as that in the first security group.

Optionally, the configuration module 404 includes a configuration unit, adapted to, if both the specified source group and the specified destination group are primary security groups, configure the specified rule according to the specified source group, the specified destination group, and the specified action indicator, and configure the storage sequence of the specified rule, where the primary security group is an independent security group that has no inclusion relationship or overlap relationship with another security group in the arranged security groups.

Figure 16:
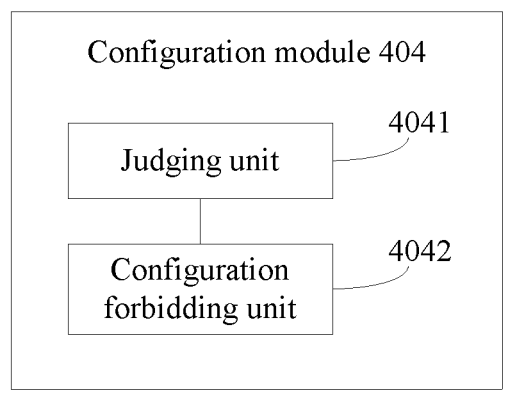
FIG. 16 is a schematic structural diagram of a first configuration module according to an embodiment of the present disclosure.

Optionally, as shown in FIG. 16, the configuration module 404 includes a judging unit 4041, adapted to, if the specified source group or the specified destination group is a secondary security group, determine whether a first rule is configured, where the first rule is a rule between a parent group of the specified source group and the specified destination group, a rule between the specified source group and a parent group of the specified destination group, or a rule between a parent group of the specified source group and a parent group of the specified destination group; where the judging unit 4041 is further adapted to, if the first rule is configured, determine whether the specified action indicator is the same as an action indicator included in the first rule; and a configuration forbidding unit 4042, adapted to forbid configuring of the specified rule if the specified action indicator is the same as the action indicator included in the first rule.

Figure 17:
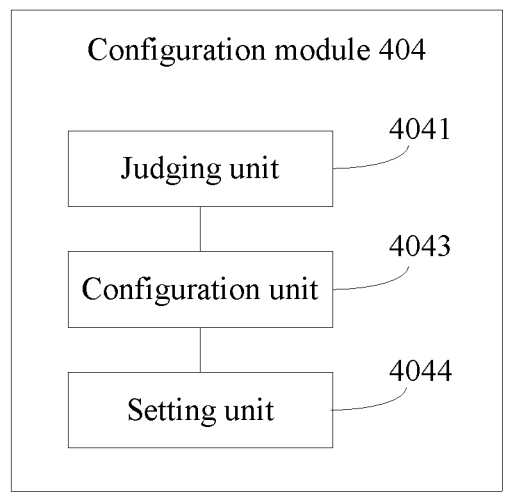
FIG. 17 is a schematic structural diagram of a second configuration module according to an embodiment of the present disclosure.

Optionally, as shown in FIG. 17, the configuration module 404 further includes a configuration unit 4043, adapted to, if the specified action indicator conflicts with the action indicator included in the first rule, configure the specified rule according to the specified source group, the specified destination group, and the specified action indicator; and a setting unit 4044, adapted to set that the storage sequence of the specified rule precedes that of the first rule.

Figure 18:
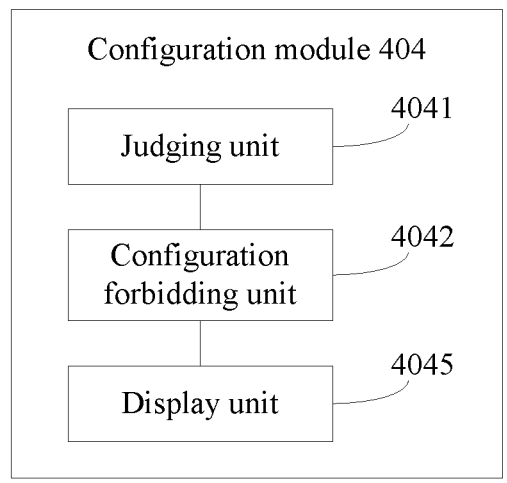
FIG. 18 is a schematic structural diagram of a third configuration module according to an embodiment of the present disclosure.

Optionally, as shown in FIG. 18, the configuration module 404 further includes a display unit 4045, adapted to display "configuration forbidden" prompt information to prompt the administrator that configuring of the specified rule is forbidden and that the specified rule is a redundant rule.

Figure 19:
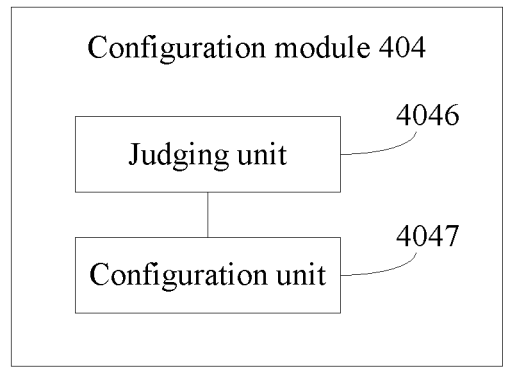
FIG. 19 is a schematic structural diagram of a fourth configuration module according to an embodiment of the present disclosure.

Optionally, as shown in FIG. 19, the configuration module 404 includes a judging unit 4046, adapted to determine whether a second rule is configured if the specified source group is a secondary security group and the specified destination group is a parent group of a seventh security group, or if the specified source group is a parent group of an eighth security group and the specified destination group is a secondary security group, where when the specified source group is the secondary security group, and the specified destination group is the parent group of the seventh security group, the second rule is a rule between a parent group of the specified source group and the specified destination group or a rule between the specified source group and the seventh security group; or when the specified source group is the parent group of the eighth security group, and the specified destination group is the secondary security group, the second rule is a rule between the specified source group and the specified destination group or a rule between the eighth security group and a parent group of the specified destination group, where the seventh security group and the eighth security group are any security groups in the arranged security groups; where the judging unit 4046 is further adapted to, if the second rule is configured, determine whether the specified action indicator is the same as an action indicator included in the second rule; and a configuration unit 4047, adapted to, if the specified action indicator is the same as the action indicator included in the second rule, configure the specified rule according to the specified source group, the specified destination group, and the specified action indicator.

Figure 20:
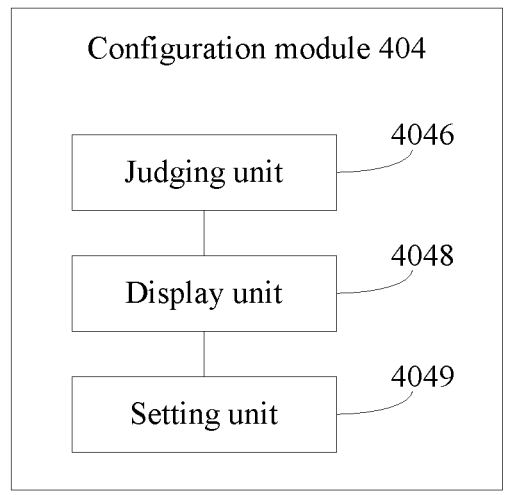
FIG. 20 is a schematic structural diagram of a fifth configuration module according to an embodiment of the present disclosure.

Optionally, as shown in FIG. 20, the configuration module 404 further includes a display unit 4048, adapted to, if the specified action indicator conflicts with the action indicator included in the second rule, display policy conflict prompt information to prompt the administrator to set storage sequences of the specified rule and the second rule; and a setting unit 4049, adapted to, when a sorting operation of the administrator is received, set the storage sequences of the specified rule and the second rule according to the sorting operation.

In this embodiment of the present disclosure, the stored multiple pieces of address information are grouped into the at least two security groups according to the attribute information of the hosts to which the multiple pieces of address information belong, and the at least two security groups are arranged, so that in the arranged security groups, the security group at a high level may completely include the security group at a low level and the security groups at a same level are completely independent of each other without overlap. Further, the policy configuration instruction is received, and the policy configuration instruction carries the specified source group, the specified destination group, and the specified action indicator. The specified rule and the storage sequence of the specified rule are configured according to the policy configuration instruction. Therefore, occurrence of a redundant rule and an invalid rule can be avoided, and accuracy of flow control is improved. In addition, when the data packet is received, the data packet is processed according to storage sequences of rules. Therefore, time spent on matching a rule is reduced, and efficiency of flow control is improved.

It should be noted that, when the flow control apparatus provided in the foregoing embodiment performs flow control, only division of the foregoing functional modules is used as an example for description. In an actual application, the foregoing functions may be allocated to different functional modules for completion according to a requirement, that is, an internal structure of the flow control apparatus is divided into different functional modules for completing all or some of the functions described above. In addition, the flow control apparatus embodiment and the flow control method embodiment provided in the foregoing embodiments are based on a same conception. For a specific implementation process of the flow control apparatus embodiment, refer to the method embodiment. Details are not described herein again.

Figure 21:
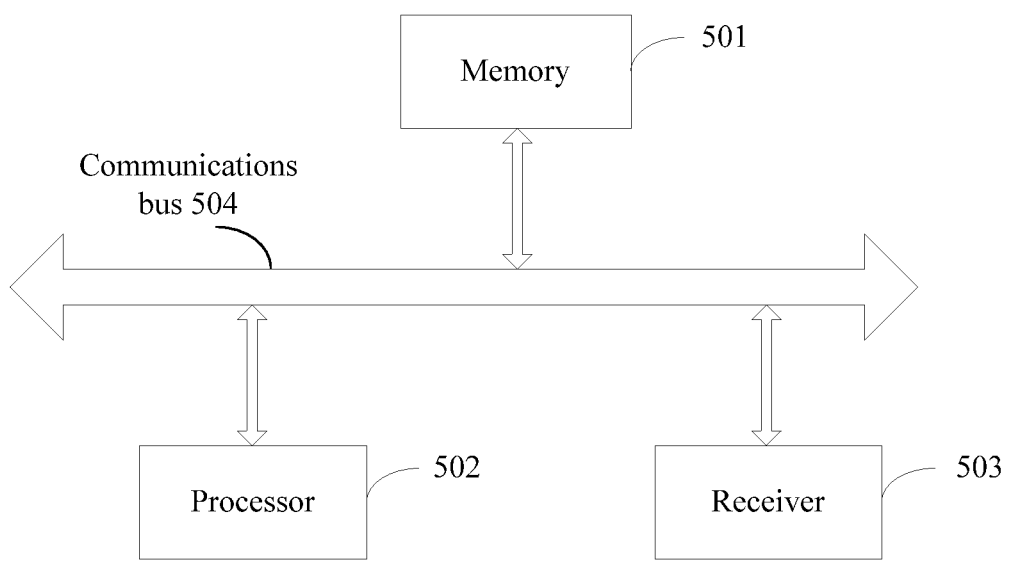
FIG. 21 is a schematic structural diagram of another flow control apparatus according to an embodiment of the present disclosure.

FIG. 21 is a schematic structural diagram of a flow control apparatus according to an embodiment of the present disclosure. Referring to FIG. 21, the apparatus includes a memory 501, a processor 502, a receiver 503, and a communications bus 504.

The memory 501 is adapted to store a message and data.

The processor 502 is adapted to group stored multiple pieces of address information into at least two security groups according to attribute information of hosts to which the multiple pieces of address information respectively belong, where the attribute information includes a service type or a security level; and arrange the at least two security groups, so that in arranged security groups, a security group at a high level may completely include a security group at a low level and security groups at a same level are completely independent of each other without overlap, where the level is used to indicate whether the security group is a parent group, a child group, or an independent security group.

The receiver 503 is adapted to receive a policy configuration instruction, where the policy configuration instruction carries a specified source group, a specified destination group, and a specified action indicator, and the specified source group and the specified destination group are two different security groups in the arranged security groups.

The processor 502 is further adapted to configure a specified rule according to the policy configuration instruction, and configure a storage sequence of the specified rule according to the policy configuration instruction, where the specified rule is any rule in at least two to-be-configured rules.

The receiver 503 is further adapted to receive a data packet after the at least two rules are configured, where the data packet carries source address information and destination address information.

The processor 502 is further adapted to process the data packet according to the at least two rules and storage sequences of the at least two rules, to implement flow control.

Optionally, the processor 502 is further adapted to determine whether an inclusion relationship or an overlap relationship exists between a first security group and multiple second security groups, where the first security group is an unarranged security group in the at least two security groups, the multiple second security groups are the arranged security groups in the at least two security groups, the inclusion relationship means that the first security group is a subset of the second security group or that the second security group is a subset of the first security group, and the overlap relationship means that an intersection exists between the first security group and the second security group and that the first security group is unequal to the second security group; if an inclusion relationship exists between the first security group and at least two second security groups in the multiple second security groups, determine a security group from the at least two second security groups as a third security group; display first acknowledgement prompt information, where the first acknowledgement prompt information is used to prompt an administrator to process an inclusion relationship between the first security group and the third security group; and if a first processing instruction is received according to the first acknowledgement prompt information, process the inclusion relationship between the first security group and the third security group according to the first processing instruction.

Optionally, the processor 502 is further adapted to, if the first security group is included in all security groups in the at least two second security groups, select, from the at least two second security groups, a security group having a smallest address range; or if the first security group includes all security groups in the at least two second security groups, select, from the at least two second security groups, a security group having a largest address range; or if the first security group is included in at least one second security group in the at least two second security groups, and the first security group further includes a remaining second security group in the at least two second security groups, select, from the at least one second security group, a security group having a smallest address range, or select, from the remaining second security group, a security group having a largest address range; and determine the selected security group as the third security group.

Optionally, the processor 502 is further adapted to determine, from the first security group and the third security group, a security group having a larger address range as a fourth security group; and determine, from the first security group and the third security group, a security group having a smaller address range as a fifth security group; if the first processing instruction is a first split instruction, remove, from the fourth security group, address information the same as that in the fifth security group to obtain a first child security group; and if the first processing instruction is an inheritance instruction, set the fifth security group as a secondary security group, and set the fifth security group as a child group of the fourth security group, where the secondary security group is a security group that has an inclusion relationship with another security group in the arranged security groups.

Optionally, the processor 502 is further adapted to, if an overlap relationship exists between the first security group and at least two second security groups in the multiple second security groups, select a security group from the at least two second security groups as a sixth security group; display second acknowledgement prompt information, where the second acknowledgement prompt information is used to prompt the administrator to process an overlap relationship between the first security group and the sixth security group; and if a second processing instruction is received according to the second acknowledgement prompt information, process the overlap relationship between the first security group and the sixth security group according to the second processing instruction.

Optionally, the processor 502 is further adapted to, if the second processing instruction is an instruction for retaining an old group, group, into a second child security group, address information that is in the first security group and that is the same as that in the sixth security group, and group, into a third child security group, other address information in the first security group than that in the second child security group; and set the second child security group as a secondary security group, and set the second child security group as a child group of the sixth security group.

Optionally, the processor 502 is further adapted to, if the second processing instruction is an instruction for retaining a new group, group, into a fourth child security group, address information that is in the sixth security group and that is the same as that in the first security group, and group, into a fifth child security group, other address information in the sixth security group than that in the fourth child security group; and set the fourth child security group as a secondary security group, and set the fourth child security group as a child group of the first security group.

Optionally, the processor 502 is further adapted to, if the second processing instruction is a second split instruction, respectively group, into three security groups, same address information in the first security group and the sixth security group, other address information in the first security group than the address information the same as that in the sixth security group, and other address information in the sixth security group than the address information the same as that in the first security group.

Optionally, the processor 502 is further adapted to, if both the specified source group and the specified destination group are primary security groups, configure the specified rule according to the specified source group, the specified destination group, and the specified action indicator, where the primary security group is an independent security group that has no inclusion relationship or overlap relationship with another security group in the arranged security groups.

Optionally, the processor 502 is further adapted to, if the specified source group or the specified destination group is a secondary security group, determine whether a first rule is configured, where the first rule is a rule between a parent group of the specified source group and the specified destination group, a rule between the specified source group and a parent group of the specified destination group, or a rule between a parent group of the specified source group and a parent group of the specified destination group; if the first rule is configured, determine whether the specified action indicator is the same as an action indicator included in the first rule; and forbid configuring of the specified rule if the specified action indicator is the same as the action indicator included in the first rule.

Optionally, the processor 502 is further adapted to, if the specified action indicator conflicts with the action indicator included in the first rule, configure the specified rule according to the specified source group, the specified destination group, and the specified action indicator; and set that the storage sequence of the specified rule precedes that of the first rule.

Optionally, the processor 502 is further adapted to display "configuration forbidden" prompt information to prompt the administrator that configuring of the specified rule is forbidden and that the specified rule is a redundant rule.

Optionally, the processor 502 is further adapted to determine whether a second rule is configured if the specified source group is a secondary security group and the specified destination group is a parent group of a seventh security group, or if the specified source group is a parent group of an eighth security group and the specified destination group is a secondary security group, where when the specified source group is the secondary security group, and the specified destination group is the parent group of the seventh security group, the second rule is a rule between a parent group of the specified source group and the specified destination group or a rule between the specified source group and the seventh security group; or when the specified source group is the parent group of the eighth security group, and the specified destination group is the secondary security group, the second rule is a rule between the specified source group and the specified destination group or a rule between the eighth security group and a parent group of the specified destination group, where the seventh security group and the eighth security group are any security groups in the arranged security groups; if the second rule is configured, determine whether the specified action indicator is the same as an action indicator included in the second rule; and if the specified action indicator is the same as the action indicator included in the second rule, configure the specified rule according to the specified source group, the specified destination group, and the specified action indicator.

Optionally, the processor 502 is further adapted to, if the specified action indicator conflicts with the action indicator included in the second rule, display policy conflict prompt information to prompt the administrator to set storage sequences of the specified rule and the second rule; and when a sorting operation of the administrator is received, set the storage sequences of the specified rule and the second rule according to the sorting operation.

The processor 502 may be an integrated circuit chip, and has a signal processing capability. In an implementation process, steps in the foregoing methods can be completed using an integrated logical circuit of hardware in the processor or instructions in a form of software. The instructions may be implemented and controlled by the processor, and are used to perform the methods disclosed in the embodiments of the present disclosure. The processor may be a general purpose processor, a digital signal processor (DSP), an application-specific integrated circuit (ASIC), a field programmable gate array (FPGA) or another programmable logic device, a discrete gate or a transistor logic device, or a discrete hardware component.

The general purpose processor may be a microprocessor, or the processor may be any conventional processor, decoder, or the like. The steps of the methods disclosed with reference to the embodiments of the present disclosure may be directly performed and completed by a hardware processor, or may be performed and completed using a combination of the hardware in the processor and a software module. The software module may be located in a mature storage medium in the art, such as a random access memory, a flash memory, a read-only memory, a programmable read-only memory, an electrically erasable programmable memory, or a register.

In addition, hardware components in the flow control apparatus are coupled together using the communications bus 504. In addition to a data bus, the communications bus 504 includes a power bus, a control bus, and a status signal bus. However, for clear description, various buses are marked as the communications bus 504 in FIG. 21.

In this embodiment of the present disclosure, the stored multiple pieces of address information are grouped into the at least two security groups according to the attribute information of the hosts to which the multiple pieces of address information belong, and the at least two security groups are arranged, so that in the arranged security groups, the security group at a high level may completely include the security group at a low level and the security groups at a same level are completely independent of each other without overlap. Further, the policy configuration instruction is received, and the policy configuration instruction carries the specified source group, the specified destination group, and the specified action indicator. The specified rule and the storage sequence of the specified rule are configured according to the policy configuration instruction. Therefore, occurrence of a redundant rule and an invalid rule can be avoided, and accuracy of flow control is improved. In addition, when the data packet is received, the data packet is processed according to storage sequences of rules. Therefore, time spent on matching a rule is reduced, and efficiency of flow control is improved.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, or an optical disc.

The foregoing descriptions are merely examples of the embodiments of the present disclosure, but are not intended to limit the present disclosure. Any modification, equivalent replacement, and improvement made without departing from the principle of the present disclosure shall fall within the protection scope of the present disclosure.

What is claimed is:

1. A flow control method comprising:
grouping stored multiple pieces of address information into at least three security groups according to attribute information of hosts to which the multiple pieces of address information respectively belong, wherein the attribute information comprises a service type or a security level;
arranging the at least three security groups so that, in arranged security groups, a security group at a high level completely comprises a security group at a low level and security groups at a same level are completely independent of each other without overlap, wherein the level is used to indicate whether the security group is a parent group, a child group, or an independent security group;
receiving a policy configuration instruction, wherein the policy configuration instruction carries a specified source group, a specified destination group, and a specified action indicator, and wherein the specified source group and the specified destination group are two different security groups in the arranged security groups;
configuring a specified rule according to the policy configuration instruction;
configuring a storage sequence of at least two rules according to the policy configuration instruction, wherein the specified rule is generated according to the policy configuration instruction, wherein the at least two rules comprise the specified rule and another configuration rule, and wherein each rule of the at least two rules comprises a match condition and an action indicator;
receiving a data packet after the at least two rules are configured, wherein the data packet carries source address information and destination address information; and
processing the data packet according to the at least two rules and storage sequences of the at least two rules, to implement flow control by:
successively comparing source address information and destination address information carried in the data packet with a match condition in the at least two rules according to the storage sequences of the at least two rules,
determining, when the source address information and the destination address information are the same as the match condition in a currently compared rule, the currently compared rule as a target rule, and
comparing, when the source address information and the destination address information are not the same as the match condition in the currently compared rule, the source address information and the destination address information with a match condition in a next rule in the at least two rules according to the storage sequences of the at least two rules until a target rule is determined.

2. The method according to claim 1, wherein arranging the at least three security groups comprises:
determining whether an inclusion relationship or an overlap relationship exists between a first security group and multiple second security groups, wherein the first security group is an unarranged security group in the at least three security groups, wherein the multiple second security groups are the arranged security groups in the at least three security groups, wherein the inclusion relationship means that the first security group is a subset of the second security group or that the second security group is a subset of the first security group, and wherein the overlap relationship means that an intersection exists between the first security group and the second security group and that the first security group is unequal to the second security group;
determining a security group from at least two second security groups as a third security group when an inclusion relationship exists between the first security group and the at least two second security groups in the multiple second security groups;
displaying first acknowledgement prompt information, wherein the first acknowledgement prompt information is used to prompt an administrator to process an inclusion relationship between the first security group and the third security group; and
processing the inclusion relationship between the first security group and the third security group according to a first processing instruction when the first processing instruction is received according to the first acknowledgement prompt information.

3. The method according to claim 2, wherein determining the security group from the at least two second security groups as the third security group comprises:
selecting, from the at least two second security groups, a security group having a smallest address range when the first security group is comprised in all security groups in the at least two second security groups;
selecting, from the at least two second security groups, a security group having a largest address range when the first security group comprises all security groups in the at least two second security groups;
selecting, from at least one second security group, a security group having a smallest address range, or selecting, from a remaining second security group, a security group having a largest address range when the first security group is comprised in the at least one second security group in the at least two second security groups, and the first security group further comprises the remaining second security group in the at least two second security groups; and
determining the selected security group as the third security group.

4. The method according to claim 2, wherein processing the inclusion relationship between the first security group and the third security group according to the first processing instruction comprises:
determining, from the first security group and the third security group, a security group having a larger address range as a fourth security group;
determining, from the first security group and the third security group, a security group having a smaller address range as a fifth security group;
removing, from the fourth security group, address information the same as that in the fifth security group to obtain a first child security group when the first processing instruction is a first split instruction, wherein the first child security group comprises remaining address information after the removing; and
setting the fifth security group as a secondary security group, and setting the fifth security group as a child group of the fourth security group when the first processing instruction is an inheritance instruction, wherein the secondary security group is a security group that has an inclusion relationship with another security group in the arranged security groups.

5. The method according to claim 2, wherein after determining whether the inclusion relationship or the overlap relationship exists between the first security group and multiple second security groups, the method further comprises:

selecting a security group from the at least two second security groups as a sixth security group when the overlap relationship exists between the first security group and at least two second security groups in the multiple second security groups;

displaying second acknowledgement prompt information, wherein the second acknowledgement prompt information is used to prompt the administrator to process an overlap relationship between the first security group and the sixth security group; and processing the overlap relationship between the first security group and the sixth security group according to a second processing instruction when the second processing instruction is received according to the second acknowledgement prompt information.

6. The method according to claim 5, wherein processing the overlap relationship between the first security group and the sixth security group according to the second processing instruction comprises:

grouping, into a second child security group, address information that is in the first security group and that is the same as that in the sixth security group, and grouping, into a third child security group, other address information in the first security group than that in the second child security group when the second processing instruction is an instruction for retaining an old group;

setting the second child security group as a secondary security group; and setting the second child security group as a child group of the sixth security group.

7. The method according to claim 5, wherein processing the overlap relationship between the first security group and the sixth security group according to the second processing instruction comprises:

grouping, into a fourth child security group, address information that is in the sixth security group and that is the same as that in the first security group, and grouping, into a fifth child security group, other address information in the sixth security group than that in the fourth child security group when the second processing instruction is an instruction for retaining a new group;

setting the fourth child security group as a secondary security group; and setting the fourth child security group as a child group of the first security group.

8. The method according to claim 5, wherein processing the overlap relationship between the first security group and the sixth security group according to the second processing instruction comprises:

grouping, into three security groups, same address information in the first security group and the sixth security group, other address information in the first security group than the address information the same as that in the sixth security group, and other address information in the sixth security group than the address information the same as that in the first security group when the second processing instruction is a second split instruction.

9. The method according to claim 1, wherein configuring the specified rule according to the policy configuration instruction comprises:

configuring the specified rule according to the specified source group, the specified destination group, and the specified action indicator when both the specified source group and the specified destination group are primary security groups, wherein the storage sequence of the specified rule and another configured rule that is independent from the specified rule has no impact on flow control, wherein the primary security group is an independent security group that has no inclusion relationship or overlap relationship with another security group in the arranged security groups, and wherein the other configured rule and the specified rule are formed by independent security groups.

10. The method according to claim 1, wherein configuring the specified rule according to the policy configuration instruction, and configuring the storage sequence of the specified rule according to the policy configuration instruction comprises:

determining whether a first rule is configured when the specified source group or the specified destination group is a secondary security group, wherein the first rule is a rule between a parent group of the specified source group and the specified destination group, a rule between the specified source group and a parent group of the specified destination group, or a rule between a parent group of the specified source group and a parent group of the specified destination group;

determining whether the specified action indicator is the same as an action indicator comprised in the first rule when the first rule is configured; and forbidding configuring of the specified rule when the specified action indicator is the same as the action indicator comprised in the first rule.

11. The method according to claim 10, wherein after determining whether the specified action indicator is the same as the action indicator comprised in the first rule, the method further comprises:

configuring the specified rule according to the specified source group, the specified destination group, and the specified action indicator when the specified action indicator conflicts with the action indicator comprised in the first rule; and setting that the storage sequence of the specified rule precedes that of the first rule.

12. A flow control apparatus comprising:
a memory comprising instructions; and
one or more processors coupled with the memory, wherein the one or more processors execute the instructions to:

group stored multiple pieces of address information into at least three security groups according to attribute information of hosts to which the multiple pieces of address information respectively belong, wherein the attribute information comprises a service type or a security level;

arrange the at least three security groups so that, in arranged security groups, a security group at a high level completely comprises a security group at a low level and security groups at a same level are completely independent of each other without overlap, wherein the level is used to indicate whether the security group is a parent group, a child group, or an independent security group;

receive a policy configuration instruction, wherein the policy configuration instruction carries a specified source group, a specified destination group, and a specified action indicator, and the specified source group and the specified destination group are two different security groups in the arranged security groups;

configure a specified rule according to the policy configuration instruction;

configure a storage sequence of the at least two rules according to the policy configuration instruction, wherein the specified rule is generated according to the policy configuration instruction, wherein the at least two rules comprise the specified rule and another configured rule, and wherein each rule of the at least two rules comprises a match condition and an action indicator;

receive a data packet after the at least two rules are configured, wherein the data packet carries source address information and destination address information; and process the data packet according to the at least two rules and storage sequences of the at least two rules, to implement flow control by:
successively comparing source address information and destination address information carried in the data packet with a match condition in the at least two rules according to the storage sequences of the at least two rules,
determining, when the source address information and the destination address information are the same as the match condition in a currently compared rule, the currently compared rule as a target rule, and
comparing, when the source address information and the destination address information are not the same as the match condition in the currently compared rule, the source address information and the destination address information with a match condition in a next rule in the at least two rules according to the storage sequences of the at least two rules until a target rule is determined.

13. The apparatus according to claim 12, wherein the one or more processors further execute the instructions to:
determine whether an inclusion relationship or an overlap relationship exists between a first security group and multiple second security groups, wherein the first security group is an unarranged security group in the at least three security groups, wherein the multiple second security groups are the arranged security groups in the at least three security groups, wherein the inclusion relationship means that the first security group is a subset of the second security group or that the second security group is a subset of the first security group, and wherein the overlap relationship means that an intersection exists between the first security group and the second security group and that the first security group is unequal to the second security group;
determine a security group from at least two second security groups as a third security group when an inclusion relationship exists between the first security group and the at least two second security groups in the multiple second security groups;
display first acknowledgement prompt information, wherein the first acknowledgement prompt information is used to prompt an administrator to process an inclusion relationship between the first security group and the third security group; and
process the inclusion relationship between the first security group and the third security group according to a first processing instruction when the first processing instruction is received according to the first acknowledgement prompt information.

14. The apparatus according to claim 13, wherein the one or more processors further execute the instructions to:
select, from the at least two second security groups, a security group having a smallest address range when the first security group is comprised in all security groups in the at least two second security groups;
select, from the at least two second security groups, a security group having a largest address range when the first security group comprises all security groups in the at least two second security groups;
select, from at least one second security group, a security group having a smallest address range, or select, from a remaining second security group, a security group having a largest address range when the first security group is comprised in the at least one second security group in the at least two second security groups, and the first security group further comprises the remaining second security group in the at least two second security groups; and
determine the selected security group as the third security group.

15. The apparatus according to claim 13, wherein the one or more processors further execute the instructions to:
determine, from the first security group and the third security group and according to the first processing instruction, a security group having a larger address range as a fourth security group, and determine, from the first security group and the third security group, a security group having a smaller address range as a fifth security group when the first processing instruction is received according to the first acknowledgement prompt information;
remove, from the fourth security group, address information the same as that in the fifth security group to obtain a first child security group when the first processing instruction is a first split instruction, wherein the first child security group comprises remaining address information after the removing;
set the fifth security group as a secondary security group; and
set the fifth security group as a child group of the fourth security group when the first processing instruction is an inheritance instruction, wherein the secondary security group is a security group that has an inclusion relationship with another security group in the arranged security groups.

16. The apparatus according to claim 13, wherein the one or more processors further execute the instructions to:
select a security group from the at least two second security groups as a sixth security group when an overlap relationship exists between the first security group and at least two second security groups in the multiple second security groups;
display second acknowledgement prompt information, wherein the second acknowledgement prompt information is used to prompt the administrator to process an overlap relationship between the first security group and the sixth security group; and
process the overlap relationship between the first security group and the sixth security group according to a second processing instruction when the second processing instruction is received according to the second acknowledgement prompt information.

17. The apparatus according to claim 16, wherein the one or more processors further execute the instructions to:
group, into a second child security group, address information that is in the first security group and that is the same as that in the sixth security group, and group, into a third child security group, other address information in the first security group than that in the second child security group when the second processing instruction is received according to the second acknowledgement prompt information, and the second processing instruction is an instruction for retaining an old group;
set the second child security group as a secondary security group; and
set the second child security group as a child group of the sixth security group.

18. The apparatus according to claim 16, wherein the one or more processors further execute the instructions to:
group, into a fourth child security group, address information that is in the sixth security group and that is the same as that in the first security group, and group, into a fifth child security group, other address information in the sixth security group than that in the fourth child security group when the second processing instruction is received according to the second acknowledgement prompt information, and the second processing instruction is an instruction for retaining a new group;
set the fourth child security group as a secondary security group; and
set the fourth child security group as a child group of the first security group.

19. The apparatus according to claim 16, wherein the one or more processors further execute the instructions to group, into three security groups, same address information in the first security group and the sixth security group, other address information in the first security group than the address information the same as that in the sixth security group, and other address information in the sixth security group than the address information the same as that in the first security group when the second processing instruction is received according to the second acknowledgement prompt information, and the second processing instruction is a second split instruction.

20. The apparatus according to claim 12, wherein the one or more processors further execute the instructions to configure the specified rule according to the specified source group, the specified destination group, and the specified action indicator when both the specified source group and the specified destination group are primary security groups, wherein the storage sequences of the specified rule and another configured rule that is independent from the specified rule has no impact on flow control, wherein the primary security group is an independent security group that has no inclusion relationship or overlap relationship with another security group in the arranged security groups, and wherein the other configured rule and the specified rule are formed by independent security groups.

* * * * *